United States Patent
Kabashima et al.

(10) Patent No.: US 8,254,987 B2
(45) Date of Patent: Aug. 28, 2012

(54) METHOD AND APPARATUS FOR TRANSMITTING DATA BETWEEN RADIO EQUIPMENT AND RADIO EQUIPMENT CONTROLS

(75) Inventors: Nobumasa Kabashima, Kawasaki (JP);
Osamu Yamamoto, Kawasaki (JP);
Hajime Hasegawa, Kawasaki (JP);
Tadayuki Sakama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 491 days.

(21) Appl. No.: 12/567,333

(22) Filed: Sep. 25, 2009

(65) Prior Publication Data

US 2010/0016013 A1 Jan. 21, 2010

Related U.S. Application Data

(63) Continuation of application No. PCT/JP2007/056565, filed on Mar. 28, 2007.

(51) Int. Cl.
*H04B 7/00* (2006.01)
(52) U.S. Cl. ............. 455/552.1; 370/328; 370/343; 375/336; 375/356
(58) Field of Classification Search ............. 455/522.1; 370/328, 343; 375/336, 356
See application file for complete search history.

(56) References Cited

U.S. PATENT DOCUMENTS

| 7,602,751 B2 * | 10/2009 | Ebert et al. ............ 370/335 |
| 2005/0105534 A1 * | 5/2005 | Osterling ............ 370/395.43 |
| 2005/0105552 A1 | 5/2005 | Osterling |
| 2005/0107124 A1 | 5/2005 | Osterling et al. |
| 2009/0180423 A1 | 7/2009 | Kroener |

FOREIGN PATENT DOCUMENTS

| WO | 2005048561 | 5/2005 |
| WO | 2005048624 | 5/2005 |
| WO | 2005048625 | 5/2005 |
| WO | 2005081563 | 9/2005 |
| WO | 2007006629 | 1/2007 |

OTHER PUBLICATIONS

Ericsson AB, Huawei Technologies Co. Ltd, NEC Corporation, Nortel Networks SA and Siemens AG, "CPRI Specification V2. 1" http://www.cpri.info/spec.html, dated Mar. 31, 2006.
International Search Report dated Jun. 12, 2007.

* cited by examiner

*Primary Examiner* — Amancio Gonzalez
(74) *Attorney, Agent, or Firm* — Murphy & King, P.C.

(57) ABSTRACT

Radio equipment (RE) is shared so as to use a plurality of types of radio signals, and data (IQ data) of the plurality of types of radio signals and monitoring control data are variably arranged in a frame for transmitting and receiving data between the RE and radio equipment controls (RECs). A plurality of types of data are simultaneously transmitted and received by one communication link between the RE and the RECs.

13 Claims, 27 Drawing Sheets

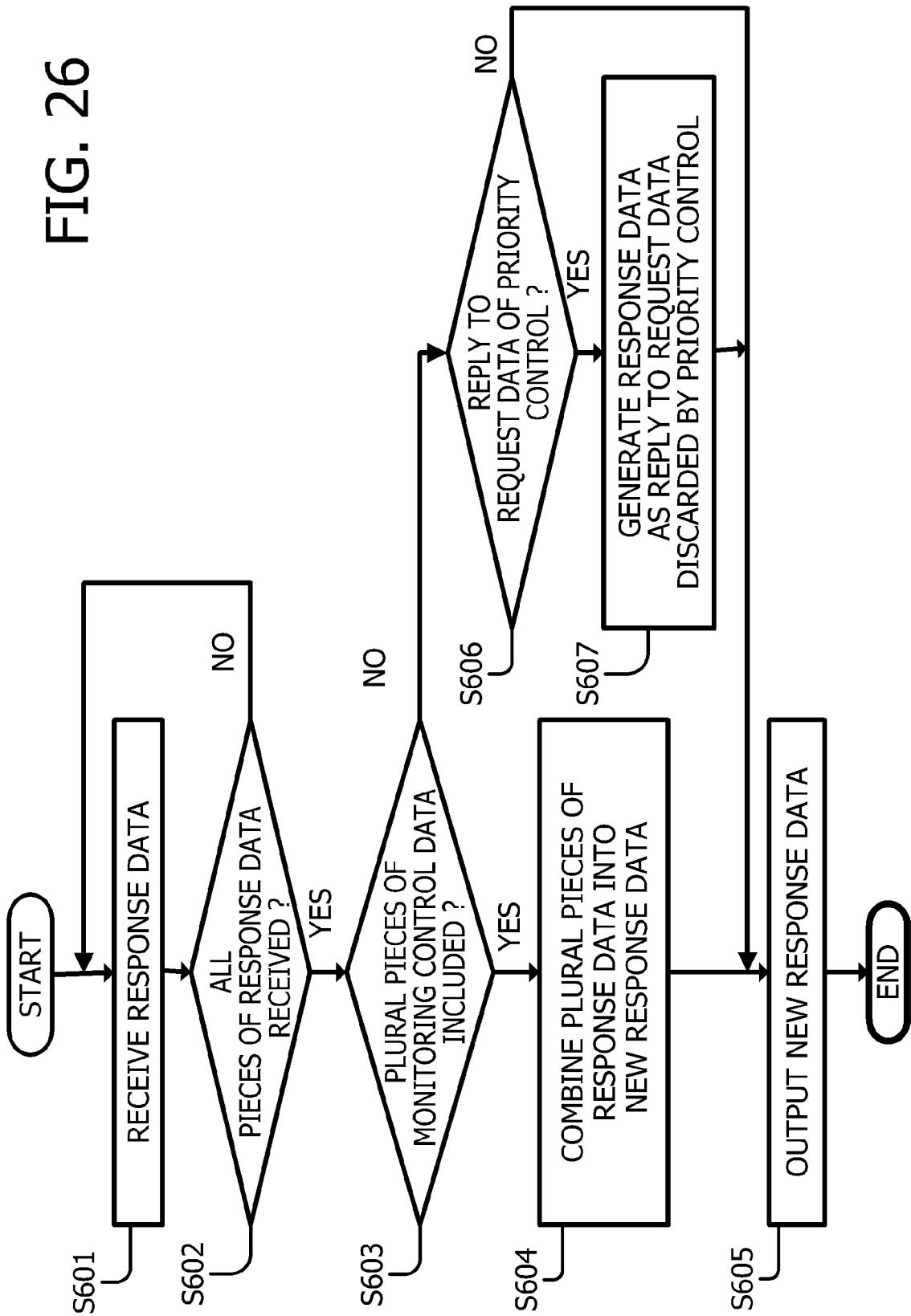

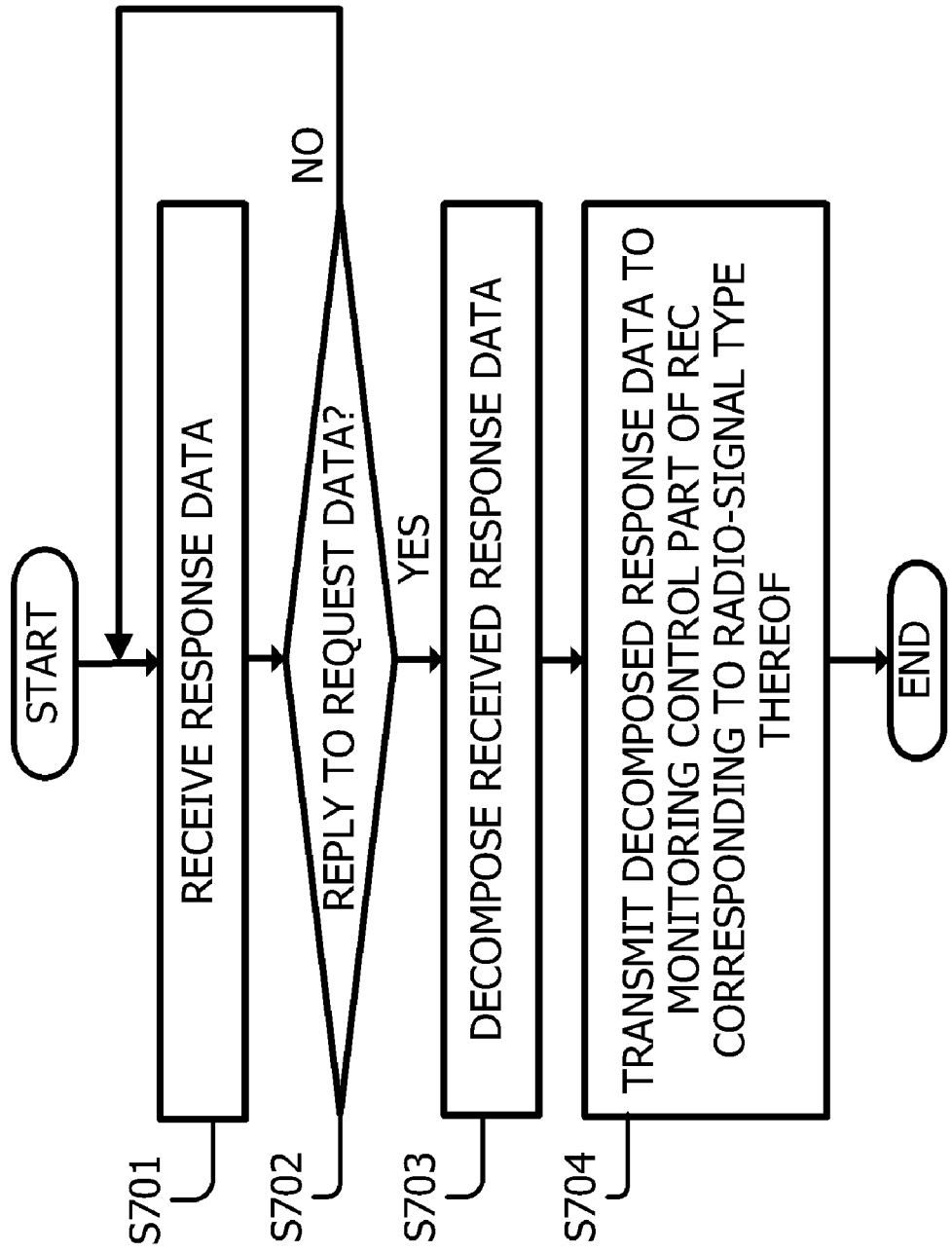

METHOD AND APPARATUS FOR TRANSMITTING DATA BETWEEN RADIO EQUIPMENT AND RADIO EQUIPMENT CONTROLS

CROSS-REFERENCE TO RELATED APPLICATIONS

This is a continuation of Application PCT/JP2007/056565, filed on Mar. 28, 2007, the entire contents of which are incorporated herein by reference.

FIELD

The present invention relates to a data communication technology between a radio equipment control (REC: Radio equipment control) and radio equipment (RE: Radio Equipment).

BACKGROUND

Current mobile communication systems follow market trends in that new mobile communication systems are structured with radio signal technology based on new communication systems so as to respond to demands for an increase in speed and capacity in communication. However, the introduction of a new mobile communication system requires that the existing mobile communication system be sequentially changed to the new mobile communication system in accordance with market trends without a significant change thereof, and that a plurality of types of the new mobile communication system be used in combination.

FIG. 1 is a diagram illustrating an example of a network configuration of a mobile communication system, in which two mobile communication systems of a 3G (Third Generation) system 100 and an LTE (Long-Term Evolution) system 200 as one of new mobile communication systems having increased speed and bandwidth compared with the 3G system, are provided concurrently.

For example, the 3G system 100 comprises: an RNC (radio network controller) 120 having a control function of controlling a radio network; an IP-RNC 120a; a BTS 110 having a function of managing and converting a radio signal; and an IP-BTS 110a. With radio signals based on a 3 G communication system, the BTS-110 and the IP-BTS 110a in the 3G system 100 are linked to a mobile terminal 1 (referred to as 3G-MS in FIG. 1).

The LTE system 200 comprises: an aGW (access gateway) 220 having a function of switching the radio signal and controlling a part of a radio network and a BTS 210 (referred to as an LTE-BTS in FIG. 1) having a function of managing and converting the radio signal. With an IP protocol, the LTE-BTS 210 in the LTE system 200 is linked to the aGW 220 as a higher-level device. Further, using a radio signal based on LTE-system communication, the LTE-BTS 210 can be linked to a mobile terminal 2 (referred to as LTE-MS in FIG. 1).

The 3G system 100 is linked to the LTE system 200 via an MSC (mobile Switching Center) 910 having a function of switching a radio signal of a core network 900 (referred to as CN), an IASA (Inter Access System Anchor) 920 that manages connection between different systems, and the aGW 220.

As the network example, the BTS 110 and the IP-BTS 110a are base transceiver stations (BTSs) that control the mobile terminal 1 (3G-MS) using a radio signal in conformity with a communication system of the 3G system 100. The LTE-BTS 210 is a base transceiver station that controls the mobile terminal 2 (LTE-MS) using a radio signal in conformity with a communication system of the LTE system 200, the mobile terminal 1 (3G-MS) and the mobile terminal 2 (LTE-MS) need to be simultaneously controlled by the same base transceiver station so that seamless communication of data is achieved between the mobile terminal 1 (3G-MS) and the mobile terminal 2 (LTE-MS) using radio signals based on different communication systems.

FIG. 2 is a diagram illustrating an example of a configuration of a base transceiver station (BTS), in which the BTS 110 in the 3G system 100 is depicted as a representative example.

The base transceiver station 110 includes a radio equipment control 111 (REC) that allows communication of data with the RNC 120 as a higher-level device, the mobile terminal 1 (3G-MS), and the radio equipment 112 (RE) that performs radio communication using a radio signal in conformity with the communication system for 3G system. The RE 112 is set for, e.g., an underground mall. Thus, the mobile terminal 1 can also be used at a place where radio waves do not sufficiently reach from the setting position of the REC 111. In general, a plurality of the REs 112 are disposed and are connected to one REC 111, via a communication link 8 using, for example, an optical fiber. The REC 111 transmits and receives data corresponding to the radio signal for the 3G system to the RE 112 via the communication link 8, thereby achieving communication of the data with the RNC 120 as a higher-level device.

Regarding the installation manner of the base terminal station (BTS), in general, the radio equipment control (REC) and the radio equipment (RE) are set apart from each other and are connected with a one-to-n correspondence using optical fibers. The number of cases where a Common Public Radio Interface (CPRI) is used as an interface for the communication link between the REC and the RE, has increased. The CPRI Specification V2.1 discloses the details of the CPRI.

FIG. 3 is a diagram illustrating an example of an outline of a communication protocol defined by the CPRI.

As for data (IQ data), an "IQ Data" frame of Layer 2 and "User Plane" of Layer 3 are used. Further, an HDLC frame of "LAPB Protocol" of the Layer 2 and "Control & Management Plane" of the Layer 3 are used for transmission and reception of monitoring control data in order to maintain and monitor the RE 112. A "Vender Specific" frame of the Layer 2 is used for a specific purpose by a vender. Hereinbelow, a transfer frame for transmitting and receiving the data (IQ data) is referred to as an IQ data frame, a transfer frame for transmitting and receiving the monitoring control data is referred to as an HDLC frame, and a transfer frame for transmitting and receiving the "Vender Specific" data is referred to as a VS frame.

The details of the communication protocol defined by the CPRI are disclosed in the CPRI Specification V2.1. Herein, a description thereof is thus omitted.

SUMMARY

According to an aspect of the embodiment, there is provided a method for transmitting a frame storing data included in radio signals between radio equipment for communicating with mobile terminals by using the radio signals and radio equipment controls for processing the radio signals. The method including: generating bitmap information indicating a position in a transfer frame at which data included in a radio signal is arranged; transmitting the transfer frame storing the data by adding the generated bitmap information thereto;

extracting the data from the transfer frame on the basis of the bitmap information added thereto;

combining first data included in a first radio signal and second data included in a second radio signal that is different in transmission method from the first radio signal, into third data, wherein the third data is combined on the basis of third bitmap information that is obtained by combining first bitmap information of the first data and second bitmap information of the second data when simultaneous transmission of the first and second data is required, and the transfer frame storing the third data is transmitted with the third bitmap information added thereto; and decomposing the third data into the first and second data on the basis of the first or second bitmap information obtained by decomposing the third bitmap information added to the transfer frame storing the third data when receiving the first or second data.

The object and advantages of the embodiment will be realized and attained by means of the elements and combinations particularly pointed out in the claims.

It is to be understood that both the forgoing general description and the following detailed description are exemplary and explanatory and are not respective of the embodiment, as claimed.

BRIEF DESCRIPTION OF THE DRAWINGS

FIG. 26 is a diagram illustrating an example of an operational flow for monitoring and control, according to an embodiment; and FIG. 27 is a diagram illustrating an example of an operational flow for monitoring and control, according to an embodiment.

DESCRIPTION OF EMBODIMENTS

Figure 1:
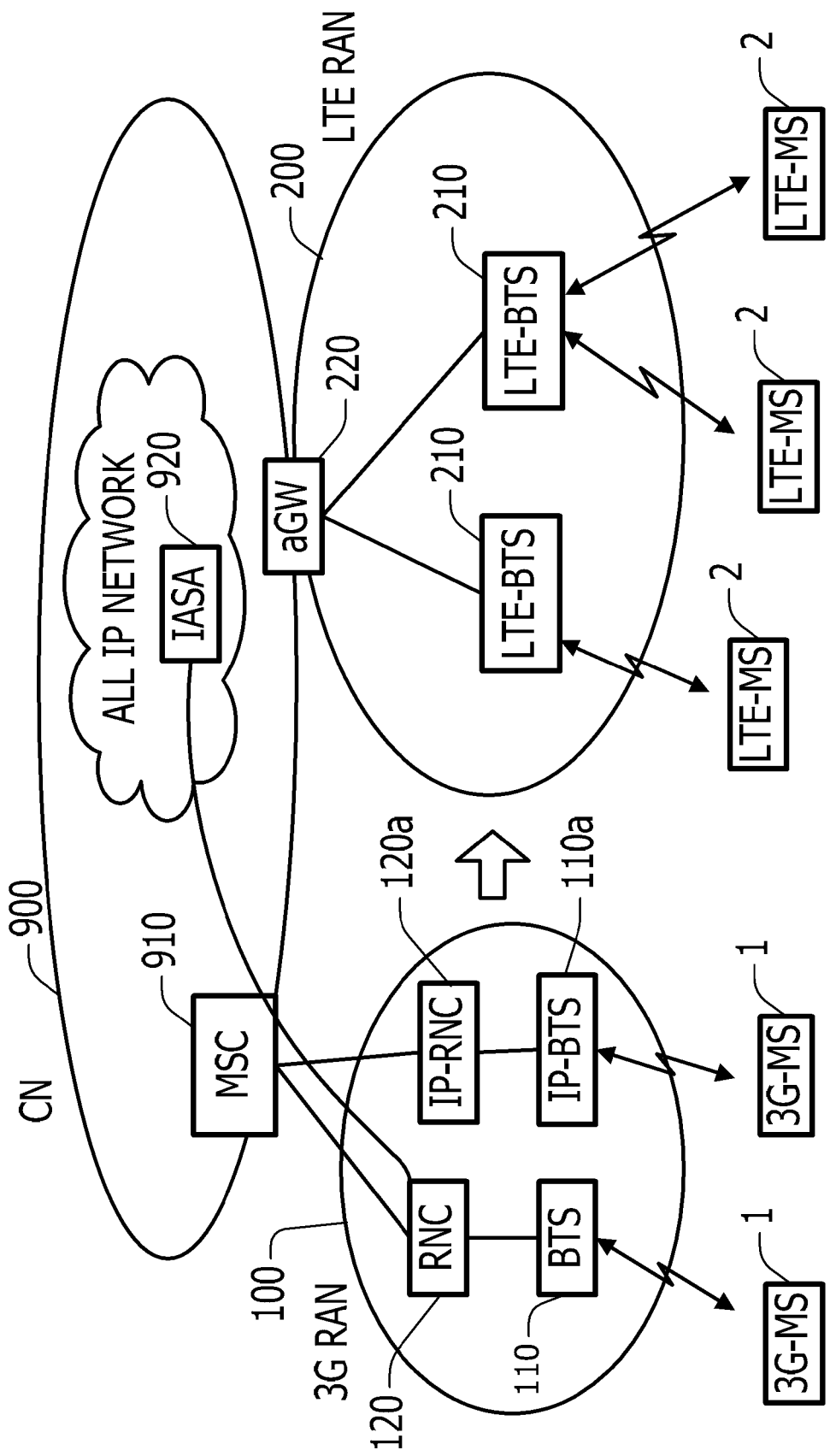
FIG. 1 is a diagram illustrating an example of a network configuration of a mobile communication system.
Figure 2:
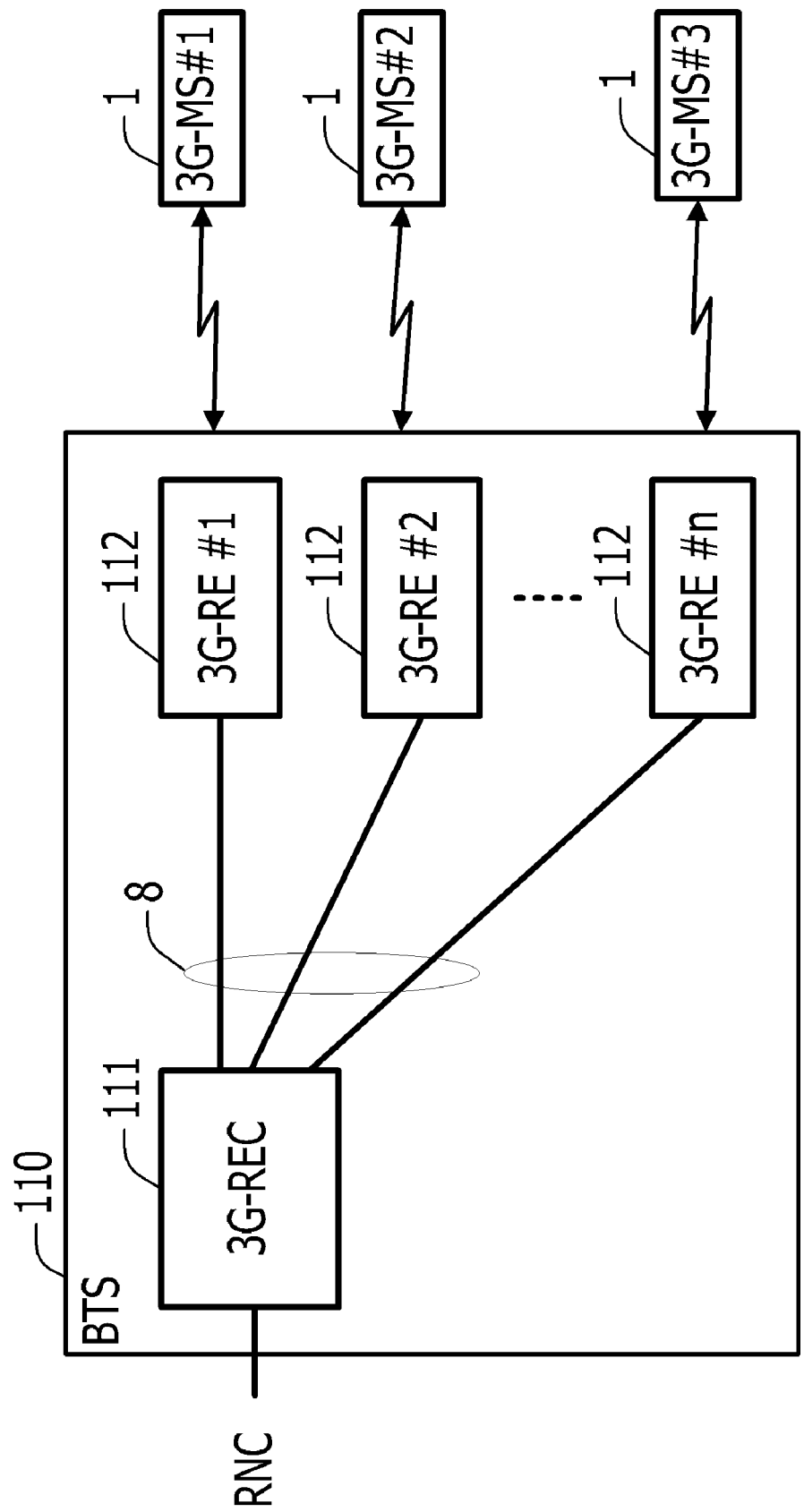
FIG. 2 is a diagram illustrating an example of a configuration of a base transceiver station (BTS)
Figure 3:
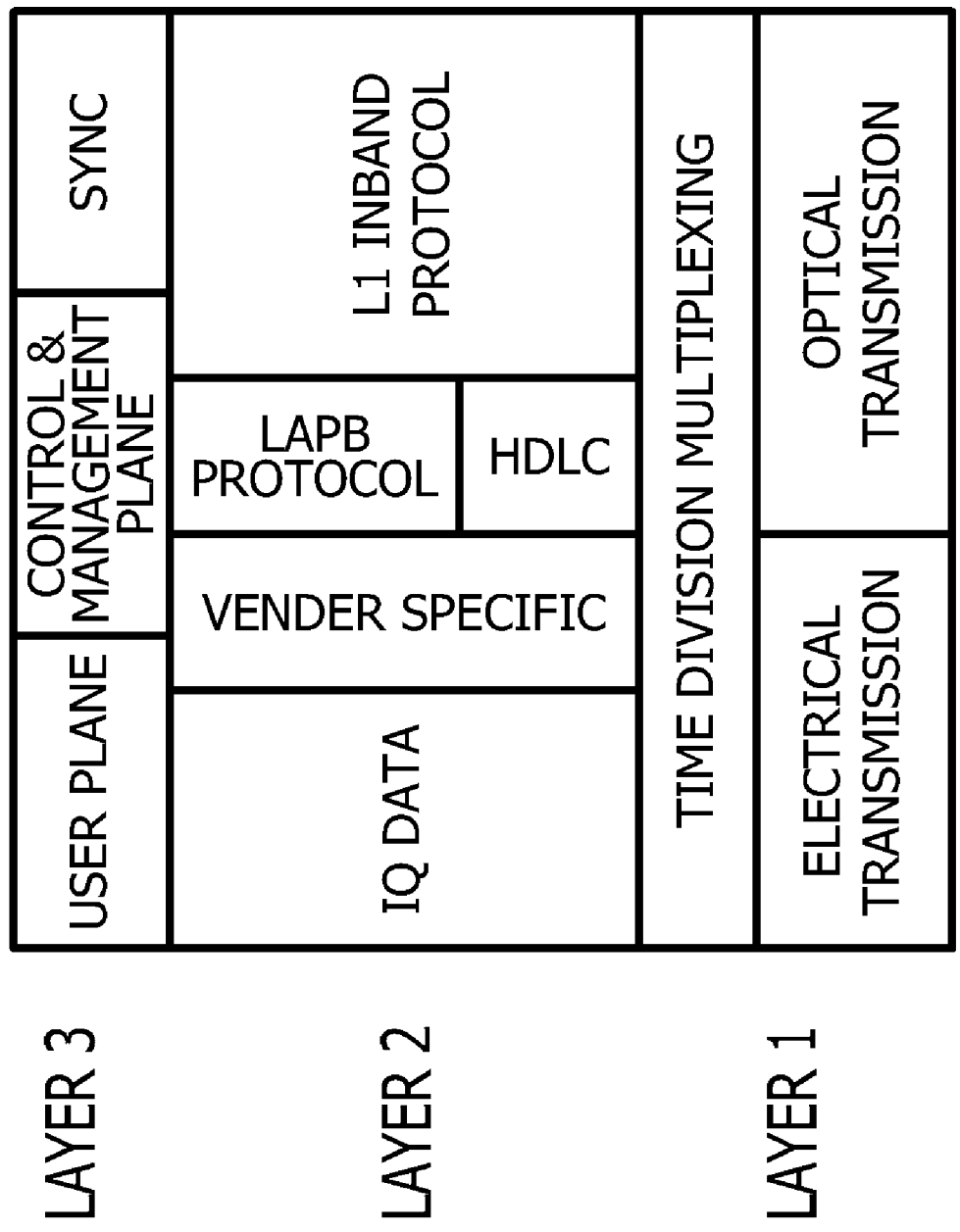
FIG. 3 is a diagram illustrating an example of an outline of a communication protocol defined by the CPRI.
Figure 4:
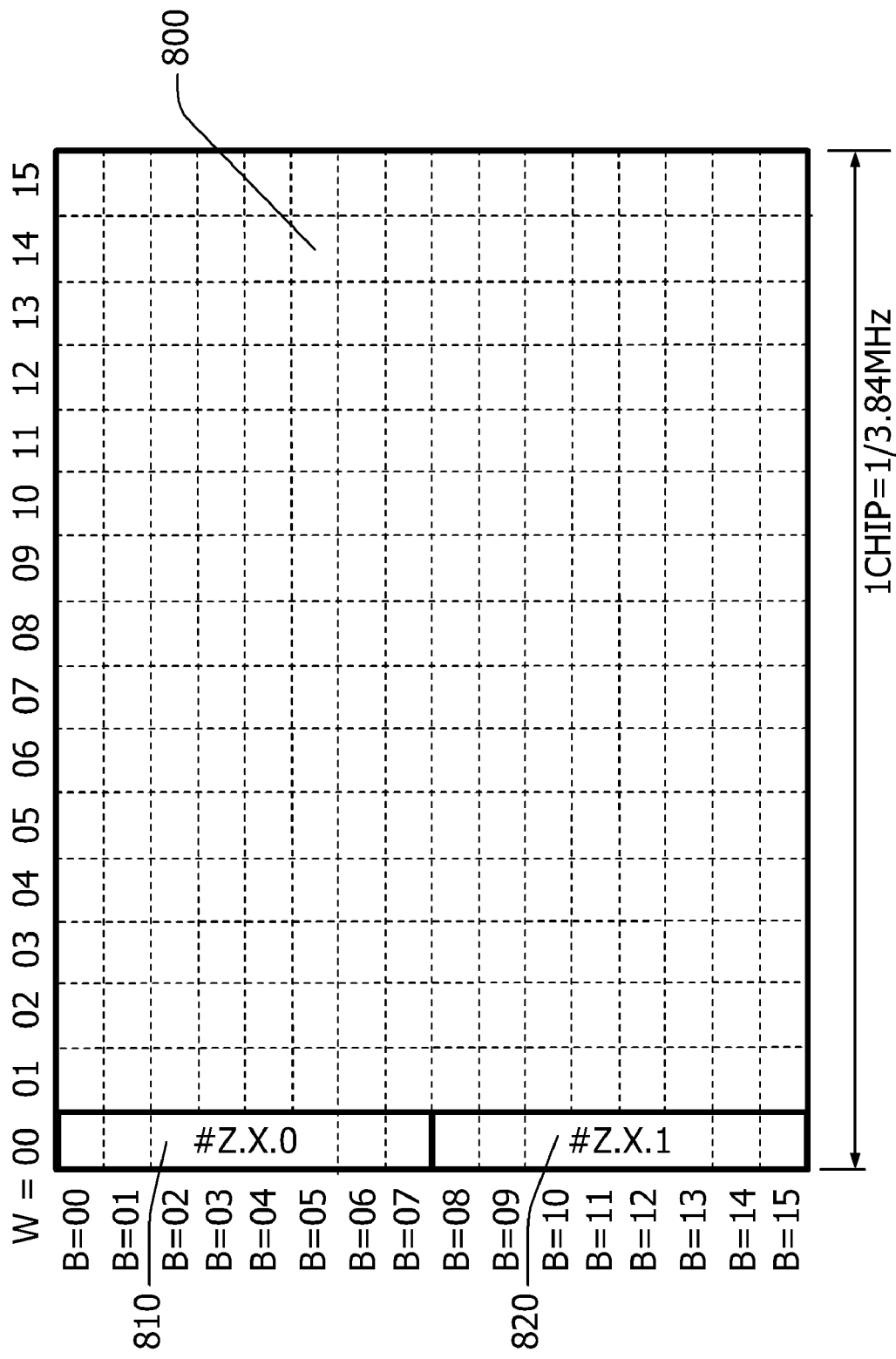
FIG. 4 is a diagram illustrating an example of a configuration of a transfer frame of data of the CPRI.

FIG. 4 is a diagram illustrating an example of a configuration of a transfer frame of data of the CPRI, in which IQ data as the data is represented by separating a radio signal into an I Phase (In Phase) and a Q phase (Quadrature Phase).

The transfer frame of the IQ data comprises 16 words (W00 to W15), and W=00 is used as a control word. Referring to FIG. 4, reference numerals #Z.X.0 and #Z.X.1 represent control words.

A bit length of one word depends on a line bit rate of the CPRI, and FIG. 4 illustrates an example in which a line bit rate of the CPRI is 1228.8 Mbit/s. In this case, as shown by B=00, . . . B=15 in FIG. 4, one word comprises 16 bits, where B=00 is LSB and B=15 is MSB.

An area 800 is an IQ data block, and the IQ data as the data is bit-mapped to the area and is transmitted between the radio equipment control (REC) and the radio equipment (RE).

Since the CPRI Specification V2.1 discloses the details of the structure of the transfer frame of the CPRI, a description thereof is omitted here.

Figure 5:
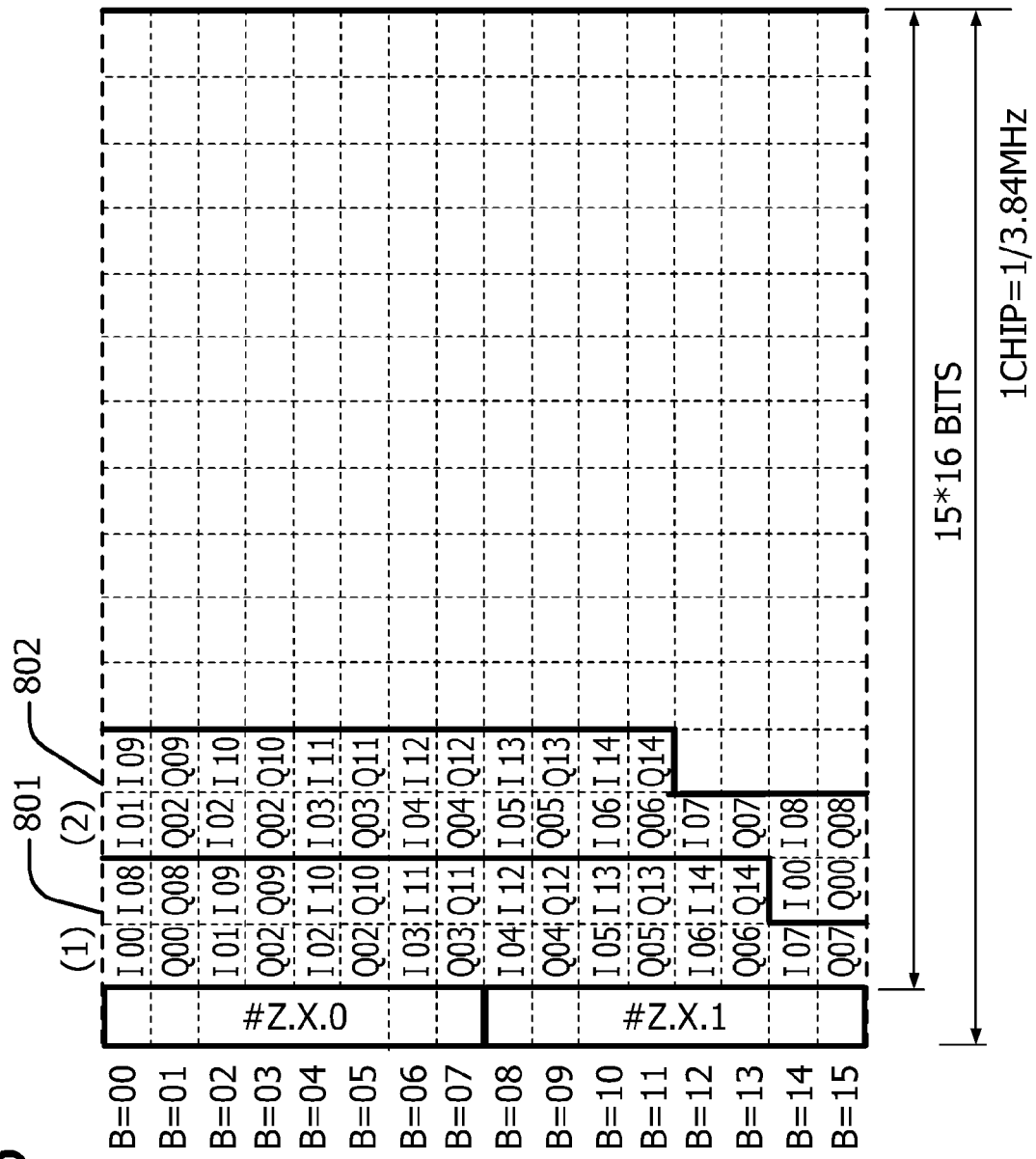
FIG. 5 is a diagram illustrating an example of an arrangement of data in a transfer frame in the case of the 3G system.

FIG. 5 is a diagram illustrating an example of an arrangement of data in a transfer frame in the case of the 3G system.

Herein, an example is depicted of the case where the data, i.e., the IQ data, corresponding to two ACs (Antenna Carrier), is accommodated in the IQ data block 800 which is depicted in FIG. 4.

The IQ data corresponding to one AC is referred to as IQ data information. Then, reference numeral 801 denotes IQ data information on the first AC, reference numerals I00 and Q00 denote LSBs, and reference numerals I14 and Q14 denote MSBs. In the case of the 3G system, the number of IQ bits for one AC is 15, and one IQ bit includes information having two bits of an I bit and a Q bit. Therefore, the length of the IQ data information is 30 bits. The bits of the IQ data information in one AC are formed by alternately arranging on time-series the I bit and Q bit in the direction from the LSB bit to the MSB one. Similarly, reference numeral 802 denotes the IQ data information on the second AC.

Figure 6:
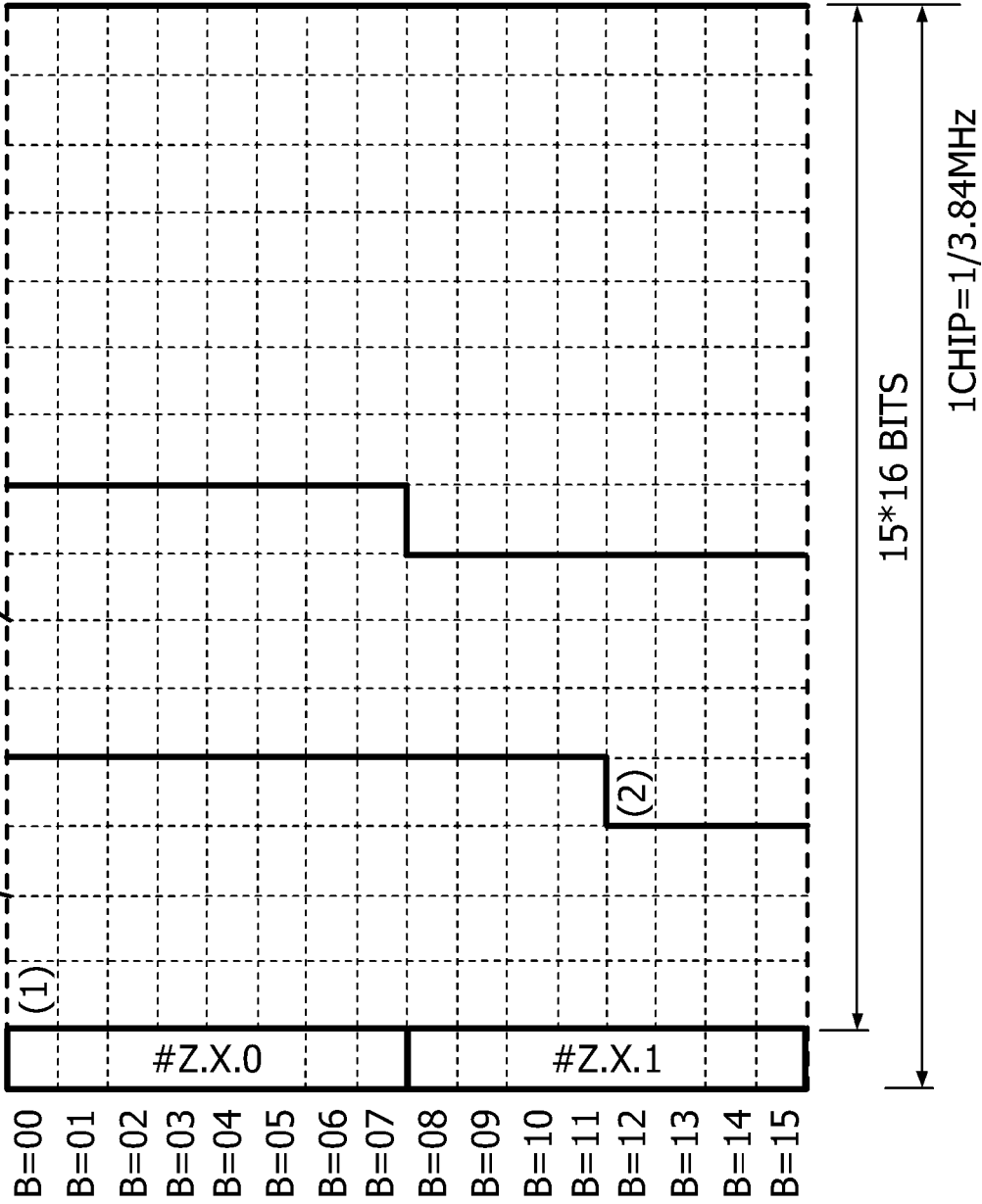
FIG. 6 is a diagram illustrating an example of an arrangement of data in a transfer frame in the case of the LTE system.

FIG. 6 is a diagram illustrating an example of an arrangement of data in a transfer frame in the case of the LTE system, in which IQ data information 801 and 802 corresponding to two ACs are accommodated in one IQ data block 800.

Since thirty IQ bits for one AC are used and one IQ bit comprises two bits of one I bit and one Q bit in the LTE system, the length of the IQ data information is 60 bits.

As depicted in FIGS. 5 and 6, the number of bits of the IQ data information is fixed every mobile communication system, i.e., for each type of a used radio signal. Therefore, the bitmap on the IQ data block of the CPRI link is peculiar to each mobile communication system. Thus, since the bitmap on the IQ data block in the transfer frame on one CPRI link is set depending on the mobile communication system, it is difficult to simultaneously mix and transmit the IQ data of different mobile communication systems by a single CPRI link.

If a plural pieces of IQ data having different numbers of bits corresponding to a plurality of different communication systems is accommodated in one CPRI link, an area in the IQ data block needs to be fixedly assigned to each of the plurality of mobile communication systems. For example, a predetermined area of the IQ data block may be assigned to an out-of-service mobile communication system, and the use efficiency of IQ data block areas is reduced. Upon expanding the system, since the assigned areas of the fixed IQ data blocks need to be rearranged, the system can not be flexibly expanded. Therefore, it is expected that it takes a long time and a large cost to extend the system.

Figure 7:
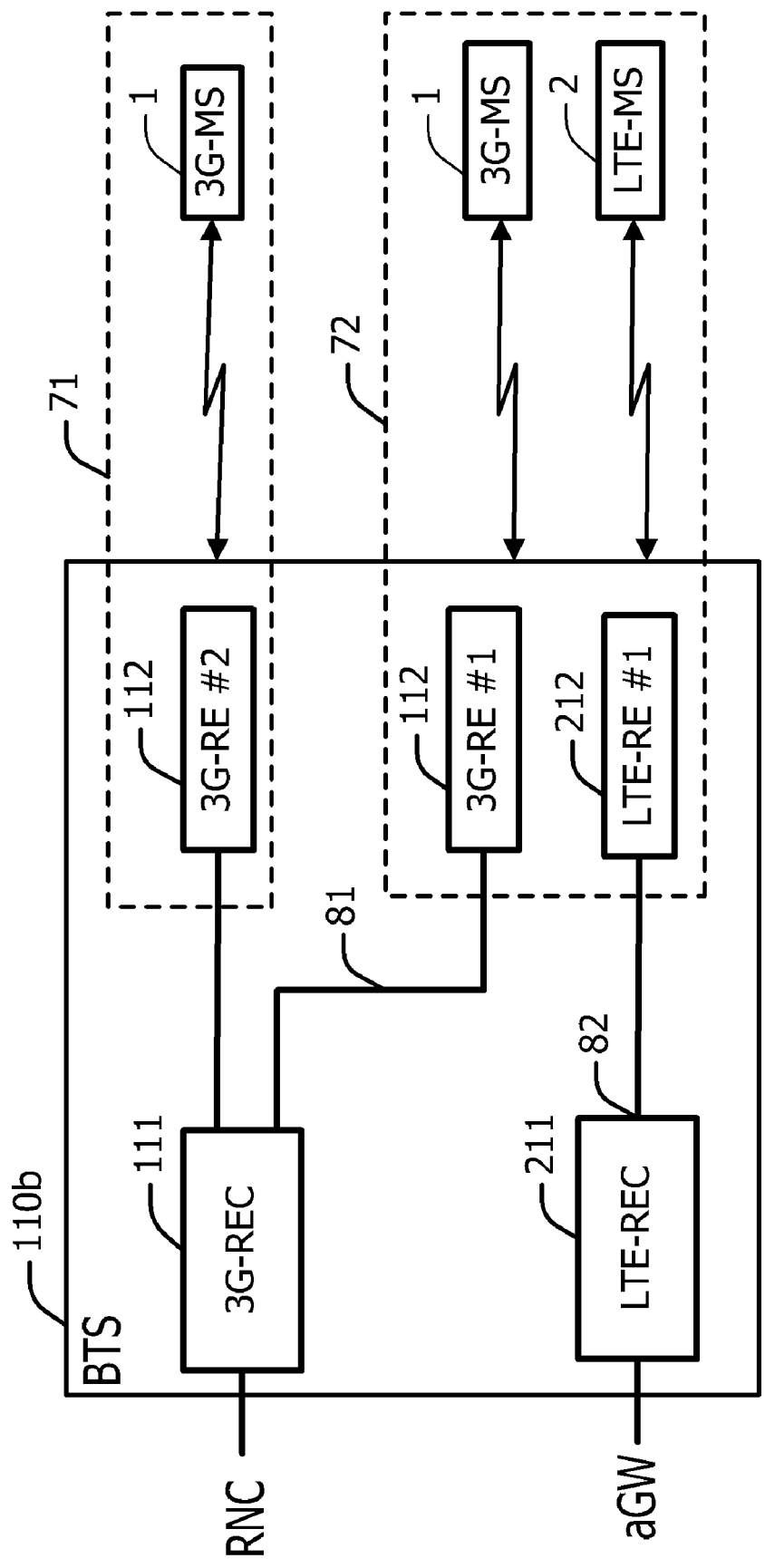
FIG. 7 is a diagram illustrating an example of a configuration of a base transceiver station (BTS)

FIG. 7 is a diagram illustrating an example of a configuration of a base terminal station (BTS), in which a plural types of mobile communication systems are mixed.

As mentioned above with reference to FIG. 5, since the IQ data of different types of mobile communication systems may not be simultaneously transmitted by one CPRI link in the current situation, each of the different types of mobile communication systems needs to use independent CPRI link and dedicated RE.

Therefore, in order to simultaneously control the mobile terminal 1 and the mobile terminal 2 using different radio signals of the 3G system and the LTE system as the two mobile communication systems with a conventional method by the same base transceiver station 110b, as depicted in FIG. 7, the radio equipment control 111 (3G-REC) for the 3G system and the radio equipment control 211 (LTE-REC) for LTE system need to be disposed and the radio equipment 112 (3G-RE) for 3G system and the radio equipment 212 (LTE-RE) for the LTE system further need to be set at the same place. Moreover, the radio equipment 112 (3G-RE) and the radio equipment 212 (LTE-RE) need to be connected to the 3G-REC 111 and the LTE-REC 211 by different communication links 81 and 82, respectively.

As mentioned above, in order to seamlessly perform radio communication between terminals in a plurality of mobile communication systems using different radio signals, the number of devices to be set (particularly, the number of REs) is increased, thereby increasing area needed for setting the devices, necessary power, and cost for setting the devices. Therefore, a large equipment investment will be required.

Further, in order to correctly control the data (IQ data), the monitoring and control of an operating state of the RE for directly controlling the radio signal is required. An operation system is generally connected to the REC, and the monitoring control data for maintaining and monitoring the RE is received and transmitted between the REC and RE in response to an instruction from the operation system. Since the monitoring control data is also fixedly stored in a transfer frame (HDLC frame) for each mobile communication system, the monitoring control data of a plurality of mobile communication systems can not be simultaneously transmitted and received by a single CPRI link.

As mentioned above, the bitmap on the IQ data block in the transfer frame is fixed by one CPRI link, depending on the mobile communication system to be used. Therefore, the IQ data of different communication systems cannot be simultaneously transmitted by one CPRI link. Further, since the monitoring control data to the radio equipment (RE) is independently transmitted and received to/from each of the mobile communication systems, a plural pieces of monitoring control data corresponding to a plurality of mobile communication systems cannot be simultaneously transmitted and received by one CPRI link.

Figure 8:
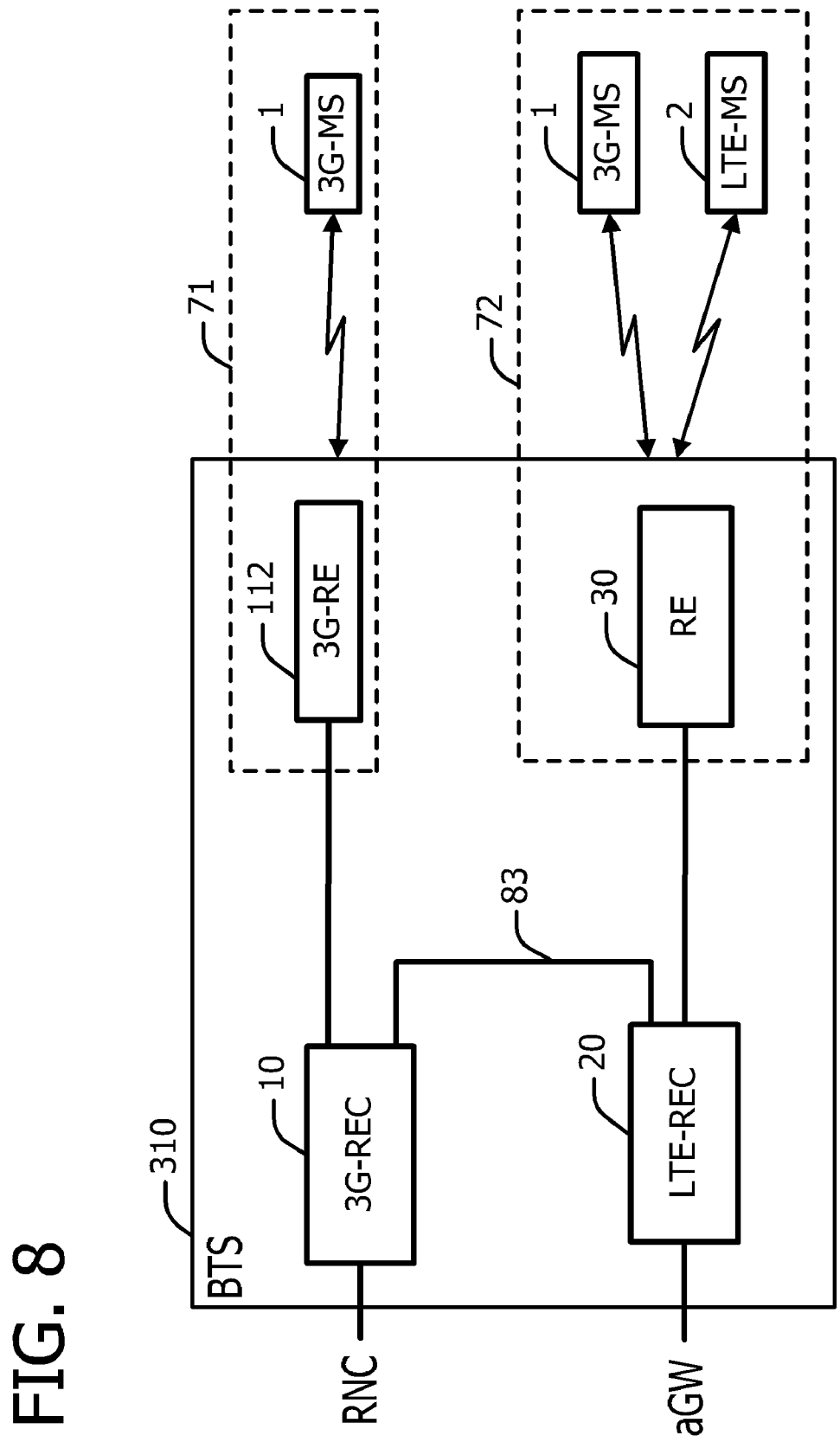
FIG. 8 is a diagram illustrating an example of a configuration of a base transceiver station (BTS), according to an embodiment.

FIG. 8 is a diagram illustrating an example of a configuration of a base transceiver station, according to an embodiment, in which a 3G-REC 10 and an LTE-REC 20, which are provided for two mobile communication systems (3G system and LTE-system), are connected with one communication link, and, also the LTE-REC 20 and one common RE 30 are connected with one communication link. Although the conventional RE radio-communicates only with a 3G-MSI as depicted by a 3G-RE 112, the RE 30 simultaneously radio-communicates with a 3G-MS1 and an LTE-MS 2 as two mobile terminals that are controlled by two mobile communication systems, respectively, according to an embodiment.

As compared with an example of the structure depicted in FIG. 7, the number of REs set in an area 72 is reduced by half, i.e., one. The 3G-REC 10 and the LTE-REC 20 need to be respectively connected to an RNC for a 3G system as a higher-level device and an aGW for an LTE system as a higher-level device and to transmit and receive data in conformity with the mobile communication systems. That is, a REC needs to be provided for each of different mobile communication systems. However, according to the embodiment, in the case of accommodating a large number of radio equipment REs, one RE can use both the radio signal of the 3G system and the radio signal of the LTE system, thereby greatly reducing equipment investment.

FIG. 8 illustrates the example of a base transceiver station 310 in the case of two mobile communication systems. Similarly in the case of three or more mobile communication systems, in this case, the third REC corresponding to the third mobile communication system can be connected to the LTE-REC 20 via a communication link that connects between the third REC and the common RE 30 (in this case, the communication link between the conventional LTE-REC 20 and the RE 30 is not required). In the case, the RE 30 can be configured to radio-communicate with three types of mobile terminals respectively corresponding to the three different mobile communication systems.

Hereinafter, according to the embodiment, a description will be given of setting the radio signal of the 3G system as the first radio signal, and the radio signal of the LTE system as the second radio signal.

Figure 9:
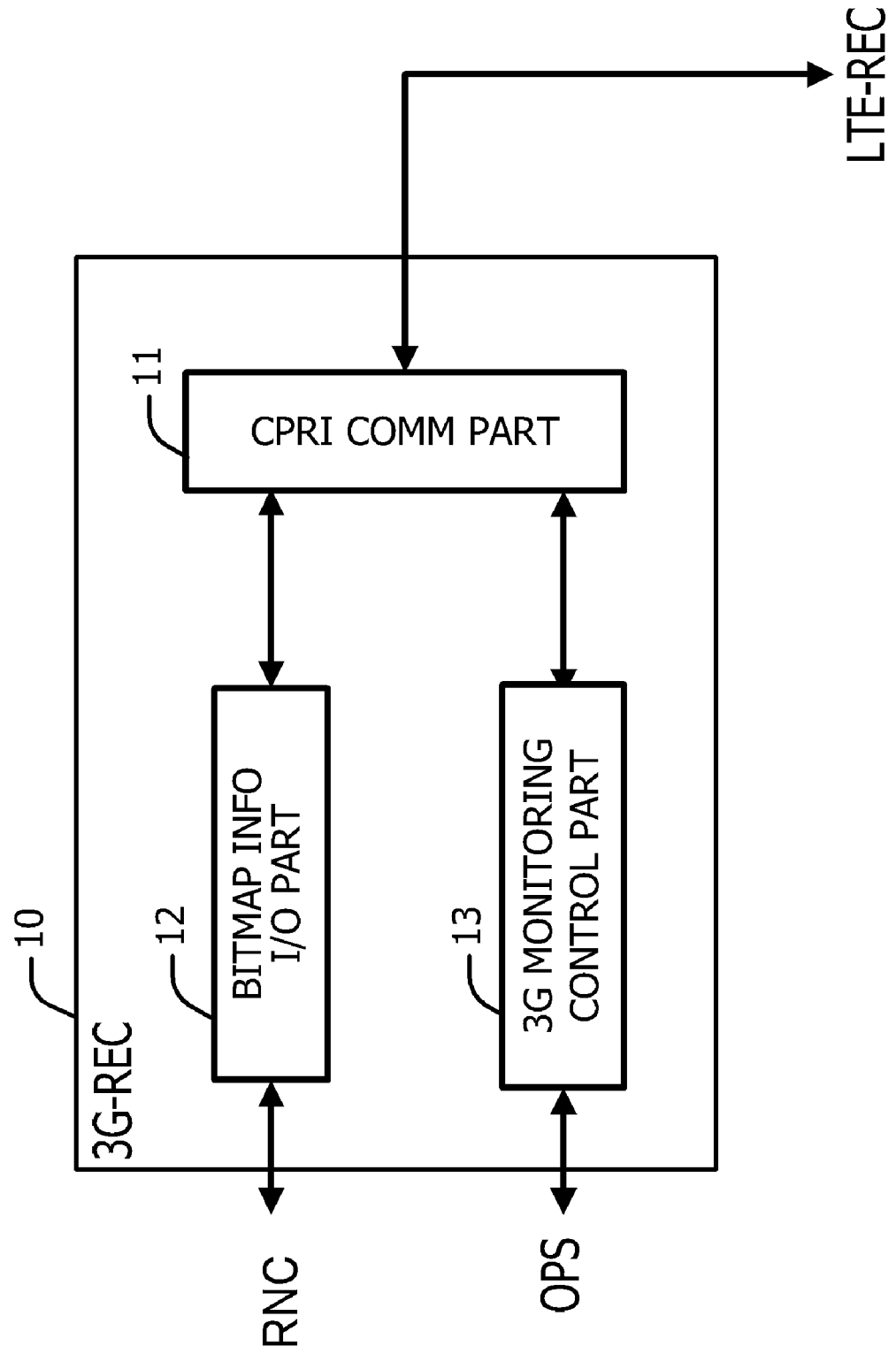
FIG. 9 is a diagram illustrating an example of a configuration of a radio equipment control (REC), according to an embodiment.

FIG. 9 is a diagram illustrating an example of a configuration of a radio equipment control (REC), according to an embodiment, in which a configuration example of an REC device 10 (3G-REC) is depicted. In the configuration example, a communication link (hereinafter, referred to as a CPRI link) in conformity with the CPRI is used, and IQ data as data and monitoring control data is transmitted and received.

The 3G-REC 10 includes a CPRI communication part 11, a bitmap information input/output part 12, and a 3G monitoring control part 13. Hereinafter, terms "information", "input/ output", and "communication" will be abbreviated as "info", "i/o", and "comm" respectively, in the drawings.

The CPRI communication part 11 transmits and receives the data (IQ data), monitoring control data, and VS data (Vender Specific data) by using a transfer frame prescribed by the CPRI.

The bitmap information input/output part 12 generates the bitmap information on the basis of the data (IQ data) of the 3G system received from the upper device (RNC), and the received IQ data and the generated bitmap information are transmitted to the LTE-REC 20 via the CPRI communication part 11. At this time, the IQ data is stored in the IQ data frame of the CPRI, and the bitmap information is stored in the VS frame of the CPRI.

Further, upon receiving the IQ data frame from the CPRI communication part 11, the bitmap information input/output part 12 extracts the data (IQ data) for the 3G system from the received IQ data frame on the basis of the bitmap information stored in the VS frame, and transmits the extracted data to the upper device (RNC).

The 3G monitoring control part 13 follows an instruction from an operation system (OPS) connected to the 3G-REC 10 to monitor a status of a card in the RE relating to the radio signal of the 3G system and control the RE 30. Therefore, the 3G monitoring control part 13 transmits request data including instruction information to the RE 30 via the CPRI communication part 11. In this case, the request data is stored in an HDLC frame of the CPRI and is then transmitted. Further, the 3G monitoring control part 13 receives the response data corresponding to the request data from the RE 30 via the CPRI communication part 11 (stored in the HRLC frame). Then, the 3G monitoring control part 13 transmits data relating to the response to the operation system (OPS) (not depicted in FIG. 9).

Figure 10:
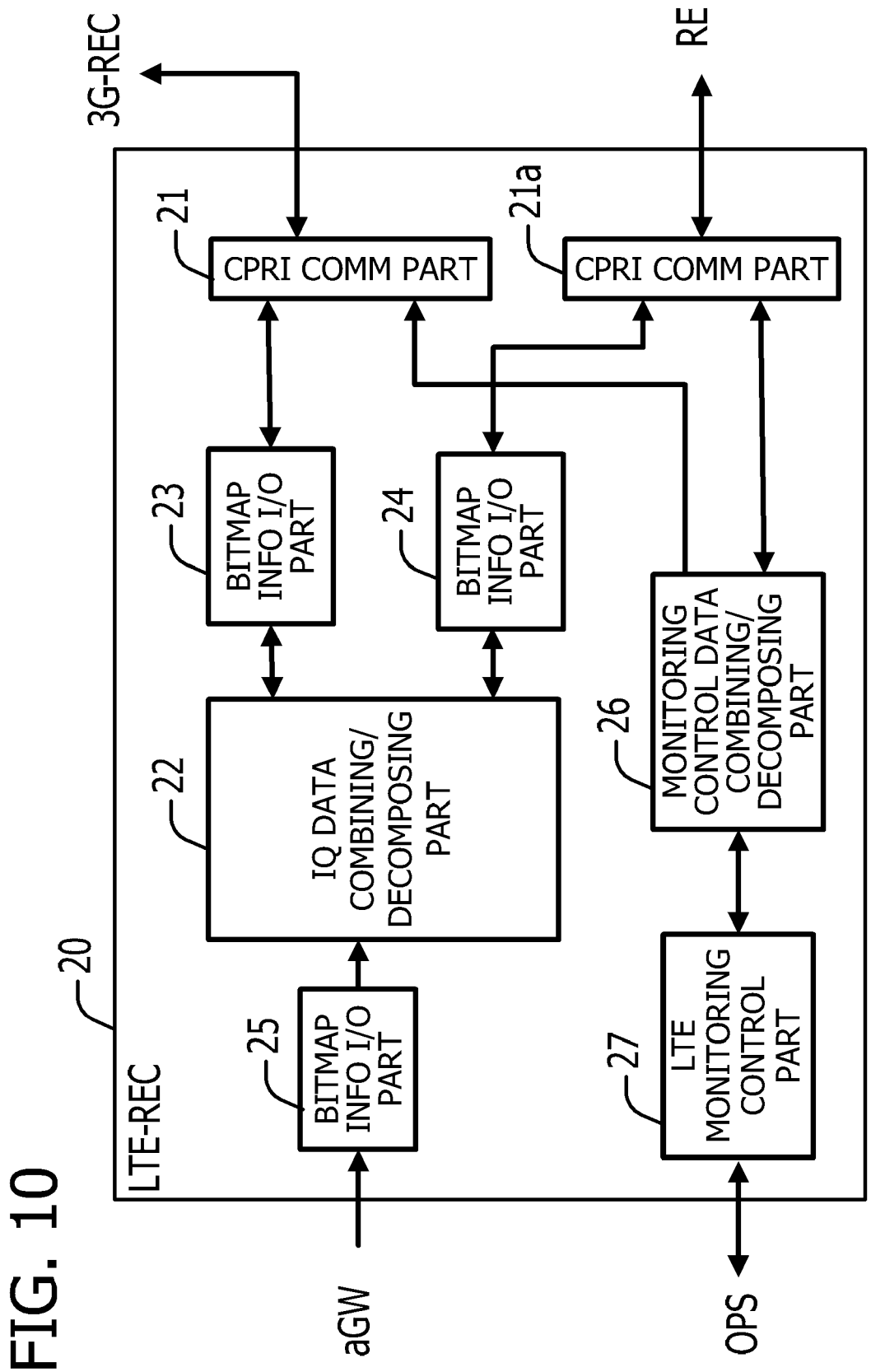
FIG. 10 is a diagram illustrating an example of a structure of a radio equipment control (REC), according to an embodiment.

FIG. 10 is a diagram illustrating an example of a configuration of a radio equipment control, according to an embodiment. In FIG. 10, a structure example of the LTE-REC 20 in the structure example of the BTS depicted in FIG. 8 is depicted.

The CPRI communication part 21 transmits and receives data to/from the 3G-REC 10 by using the transfer frame in conformity with the CPRI.

The CPRI communication part 21a transmits and receives data to/from the RE 30 by using the transfer frame in conformity with the CPRI.

The bitmap information input/output part 23 extracts the bitmap information and the IQ data block from the transfer frame received from the CPRI communication part 21 and sends the extracted bitmap information and IQ data to the IQ data combining/decomposing part 22. At this time, the bitmap information is extracted from the VS frame.

Further, the bitmap information input/output part 23 stores the bitmap information received from the IQ data combining/decomposing part 22 into the VS frame of the CPRI, sends the stored information together with the IQ data block to the CPRI communication part 21, so as to be transmitted to the 3G-REC 10.

The bitmap information input/output part 24 stores the bitmap information received from the IQ data combining/decomposing part 22 together with the IQ data block into the VS frame of the CPRI, and transmits the stored information to the RE 30 via the CPRI communication part 21a.

Further, the bitmap information input/output part 24 extracts the IQ data and the bitmap information from the transfer frame received from the CPRI communication part 21a, and sends the extracted data and information to the IQ data combining/decomposing part 22.

Upon receiving the IQ data from the upper device (aGW) (not depicted in FIG. 10), the bitmap information input/output part 25 generates the bitmap information of the received IQ data, and sends the generated information together with the IQ data to the IQ data combining/decomposing part 22.

Further, upon receiving IQ data from the IQ data combining/decomposing part 22, the bitmap information input/output part 25 transmits the IQ data to the upper device (aGW) (not depicted in FIG. 10).

Upon receiving the IQ data of the LTE system and the bitmap information thereof from the bitmap information input/output part 25, as well as the IQ data of the 3G system and the bitmap information thereof from the bitmap information input/output part 23, the IQ data combining/decomposing part 22 combines the IQ data of the 3G system received from the bitmap information input/output 23, with the IQ data of the LTE system received from the bitmap information input/output part 25, to generate the combined IQ data which is then added with bitmap information thereof and sent to the bitmap information input/output part 24, so as to be transmitted to the RE 30. Upon receiving IQ data and the bitmap information thereof from one of the bitmap information input/output 23 and the bitmap information input/output part 25, the received IQ data and the bitmap information thereof are, as they are, sent to the bitmap information input/output part 24, so as to be transmitted to the RE 30.

Further, upon receiving the IQ data and the bitmap information thereof from the bitmap information input/output part 24, the IQ data combining/decomposing part 22 separates the received IQ data into IQ data for each of types of radio signals. Then, the IQ data combining/decomposing part 22 sends the separated IQ data of the LTE system to the bitmap information input/output part 25, and adds the bitmap information to the IQ data of the 3G system, sends the separated IQ data of the 3G system to which the bitmap information thereof is added, to the bitmap information input/output 23 so as to be transmitted to the 3G-REC 10. When the IQ data received from the bitmap information input/output part 24 includes the IQ data of only one of the 3G system and the LTE system, the IQ data and the bitmap information thereof are, as they are, sent to the bitmap information input/output 23 in the case of the 3G system, and sent to the bitmap information input/output part 25 in the case of the LTE system.

The LTE monitoring control part 27 generates the monitoring control data (hereinafter, described as "request data" indicating a request regarding the RE 30 on the basis of the instruction information received from the operation system (OPS) (not depicted in FIG. 10), and sends the generated request data to the monitoring control data combining/decomposing part 26. Types of request data includes, for example, a report request for a status of a card loaded in the RE and a control request on the card.

Upon receiving the request data from one of the CPRI communication part 21 and the LTE monitoring control part 27, the monitoring control data combining/decomposing part 26 stores the received request data into the HDLC frame and transmits the stored data to the RE 30 via the CPRI communication part 21a. Further, upon simultaneously receiving request data from the CPRI communication part 21 and the LTE monitoring control part 27, the monitoring control data combining/decomposing part 26 combines the two pieces of the received request data to create new request data, and transmits the new request data to the RE 30 via the CPRI communication part 21a.

Further, upon receiving response data corresponding to the request data from the RE 30 via the CPRI communication part 21a, the monitoring control data combining/decomposing part 26 divides the received response data into two pieces of response data for the LTE system and the 3G system. Then, the monitoring control data combining/decomposing part 26 sends the response data from the LTE system to the LTE monitoring control part 27, and transmits the response data from the 3G system to the 3G-REC 10 via the CPRI communication part 21.

Figure 11:
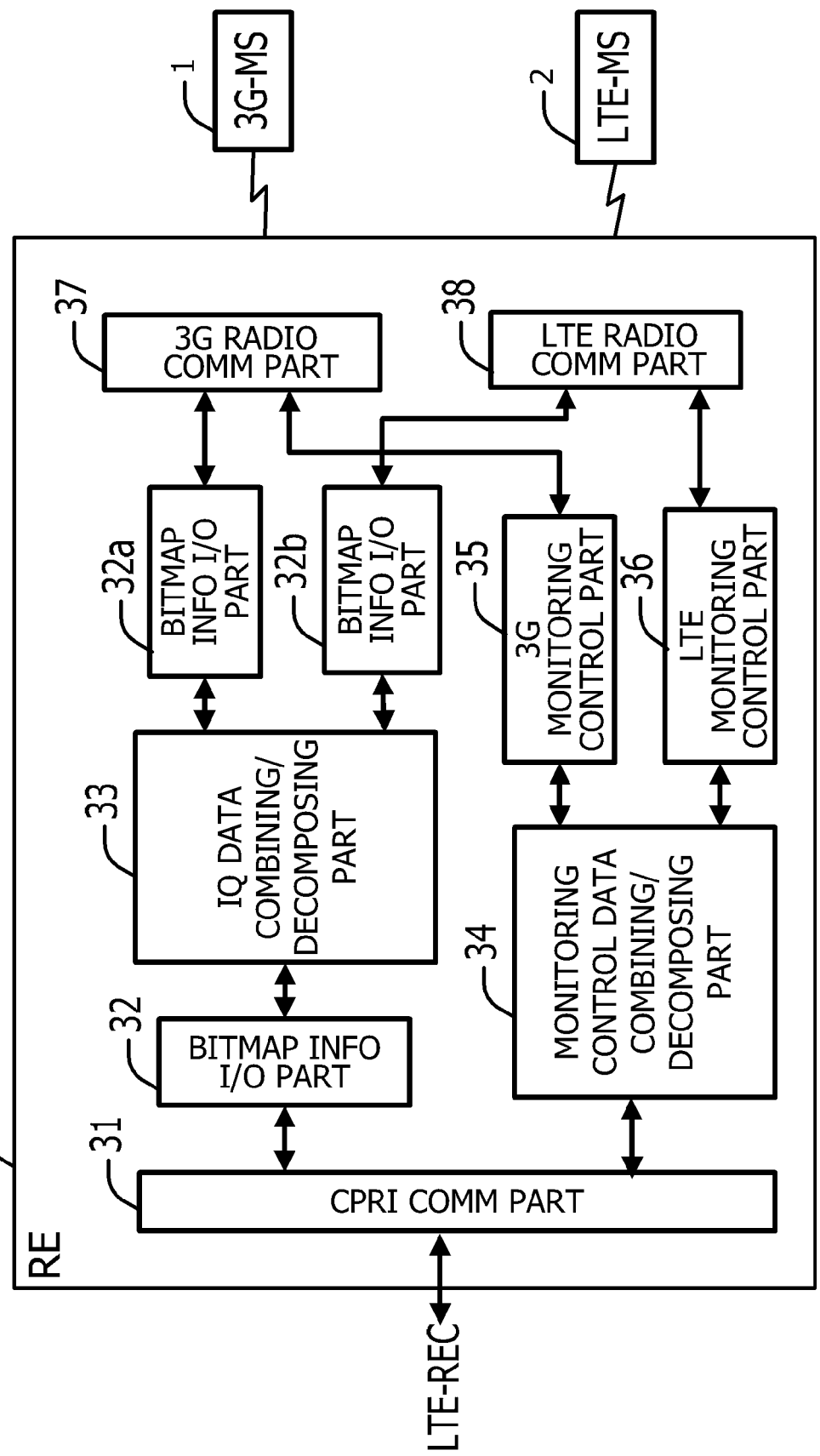
FIG. 11 is a diagram illustrating an example of a configuration of radio equipment (RE), according to an embodiment.

FIG. 11 is a diagram illustrating an example of a configuration of a radio equipment, according to an embodiment.

The CPRI communication part 31 transmits and receives the transfer frame in conformity with the CPRI to/from the LTE-REC 20.

The 3G radio communication part 37 performs radio communication with the mobile terminal 1 (3G-MS) using the radio signal for the 3G system.

The LTE radio communication part 38 performs radio communication with the mobile terminal 2 (LTE-MS) using the radio signal for the LTE system.

The bitmap information input/output part 32 extracts the bitmap information and the IQ data block from the transfer frame received from the CPRI communication part 31, and sends the extracted information to the IQ data combining/decomposing part 33. At this time, the bitmap information is extracted from the VS frame, and the IQ data block is extracted from the IQ data frame.

Further, the bitmap information input/output part 32 stores the bitmap information received from the IQ data combining/decomposing part 33 into the VS frame of the CPRI, and transmits the VS frame together with the IQ data frame to the LTE-REC 20 via the CPRI communication part 31.

The bitmap information input/output part 32a sends the IQ data of the 3G system received from the IQ data combining/decomposing part 33, to the 3G radio communication part 37. Further, the bitmap information input/output part 32a adds the bitmap information to the IQ data of the 3G system received from the 3G radio communication part 37, and sends the IQ data having the bitmap information added thereto, to the IQ data combining/decomposing part 33.

The bitmap information input/output part 32b sends the IQ data of the LTE system received from the IQ data combining/decomposing part 33 to the LTE radio communication part 38. Further, the bitmap information input/output part 32b adds the bitmap information to the IQ data of the LTE system received from the LTE radio communication part 38, and then sends the IQ data having the bitmap information added thereto, to the IQ data combining/decomposing part 33.

Upon receiving the IQ data and the bitmap information from the bitmap information input/output part 32, the IQ data combining/decomposing part 33 divides the received data into the IQ data for each type of the radio signals, sends the IQ data of the 3G system to the bitmap information input/output part 32a, and sends the IQ data of the LTE system to the bitmap information input/output part 32b.

Upon receiving the IQ data and the bitmap information from one of the bitmap information input/output part 32a and the bitmap information input/output part 32b, the IQ data combining/decomposing part 33 sends the received IQ data and bitmap information thereof to the bitmap information input/output part 32 without change. Further, upon simultaneously receiving the IQ data and the bitmap information from both the bitmap information input/output part 32a and the bitmap information input/output part 32b, the IQ data combining/decomposing part 33 combines the two pieces of the received IQ data, adds the bitmap information of the combined IQ data thereto, and sends the combined IQ data having the bitmap information thereof to the bitmap information input/output part 32.

The monitoring control data combining/decomposing part 34 decomposes the request data received from the CPRI communication part 31 into pieces of data each corresponding to a different mobile communication system, i.e., corresponding to each type of the radio signals. Then, the monitoring control data combining/decomposing part 34, in the case, sends the request data of the 3G system to the 3G monitoring control part 35, and sends the request data of the LTE system to the LTE monitoring control part 36. At this time, when the received request data includes a plurality of pieces of request data each corresponding to a different mobile communication system, it is determined whether priority control is required or not, by comparing types of the plurality of pieces of request data each other. When priority control is required, the request data is sent to the monitoring control part corresponding to a mobile communication system to be a target of a priority control (in the case of the 3G system, to the 3G monitoring control part 35 and in the case of the LTE system, to the LTE monitoring control part 36), and the request data of a mobile communication system that is not a priority control target is discarded.

Upon receiving response data of the request data, simultaneously from both the 3G monitoring control part 35 and the LTE monitoring control part 36, the monitoring control data combining/decomposing part 34 combines two pieces of the response data, and transmits the combined response data to the LTE-REC 20 via the CPRI communication part 31. Further, upon receiving response data from one of the 3G monitoring control part 35 and the LTE monitoring control part 36, the monitoring control data combining/decomposing part 34 transmits the received response data to the LTE-REC 20 via the CPRI communication part 31 without change thereof. However, upon receiving response data in response to the request data of priority, the monitoring control data combining/decomposing part 34 generates response data for the system that transmits the request data discarded under priority control, combine the generated response data and the received response data of priority, and transmits the combined response data to the LTE-REC 20 via the CPRI communication part 31.

The 3G monitoring control part 35 monitors and controls the state of the card in the RE 30 corresponding to the 3G system on the basis of the request data received from the monitoring control data combining/decomposing part 34, and sends the response data including the processing result thereof to the monitoring control data combining/decomposing part 34.

The LTE monitoring control part 36 monitors or controls the state of the card in the RE 30 corresponding to the LTE system on the basis of the request data received from the monitoring control data combining/decomposing part 34, and sends the response data including the processing result thereof to the monitoring control data combining/decomposing part 34.

Although above description indicates the case in which the number of types of radio signals is two as a typical example, the case of using three or more types of the radio signals can also be configured in the similar manner.

As mentioned above, the RE 30 according to the embodiment can perform radio communication with the mobile terminal by using a plurality of types of radio signals each corresponding to a different communication system. Further, transmission of data between RE 30 and any one of a plurality of radio equipment controls (RECs) provided for respective different radio signals can be performed by connecting between the RE 30 and the plurality of RECs using one communication link. Even if the number of types of radio signals, i.e., the number of different mobile communication systems increases, a total system can be configured by using only one RE and RECs provided for respective different radio signals. That is, since the RE does not need to be disposed for every mobile communication system, as long as one RE has been set up once, it is possible to easily deal with the case of increasing/decreasing the number of subscribers among the mobile communication systems.

Figure 12:
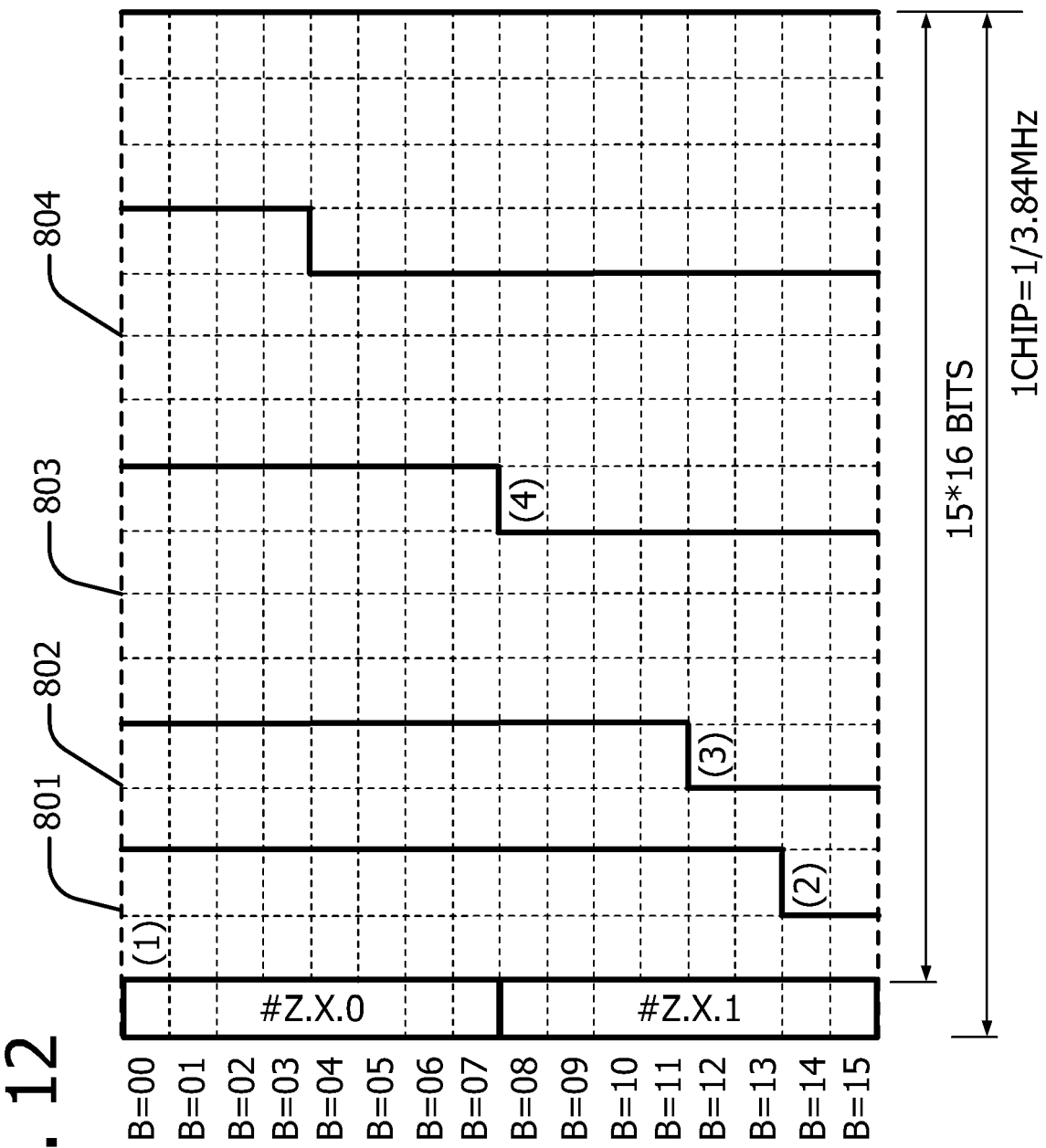
FIG. 12 is a diagram illustrating an example of a configuration of an IQ data block, according to an embodiment.

FIG. 12 is a diagram illustrating an example of a configuration of an IQ data block, according to an embodiment.

Herein, at the head bit position of the individual IQ data information, a number assigned to the IQ data information is expressed in parentheses. That is, an example is given of arranging four pieces of the IQ data information (1) to (4) in the IQ data block.

The IQ data information is arranged in a lump for each type of the radio signal used, i.e., for each mobile communication system. For example, the IQ data information (1) and (2) for 3G-system as first data is arranged from the head area, and the IQ data of the LTE system information (3) and (4) as second data is arranged in an area contiguous to the IQ data area (2), so that third data as depicted in FIG. 12 is integrated. The data is combined on the basis of the bitmap information, which will be described with reference to FIGS. 13 and 14.

As mentioned above, according to the embodiment, pieces of IQ data of different mobile communication systems are collected and arranged so as not to overlap each other. The IQ data block is transmitted and received among the 3G-REC 10, the LTE-REC 20, and the RE 30, through one CPRI link.

Figure 13:
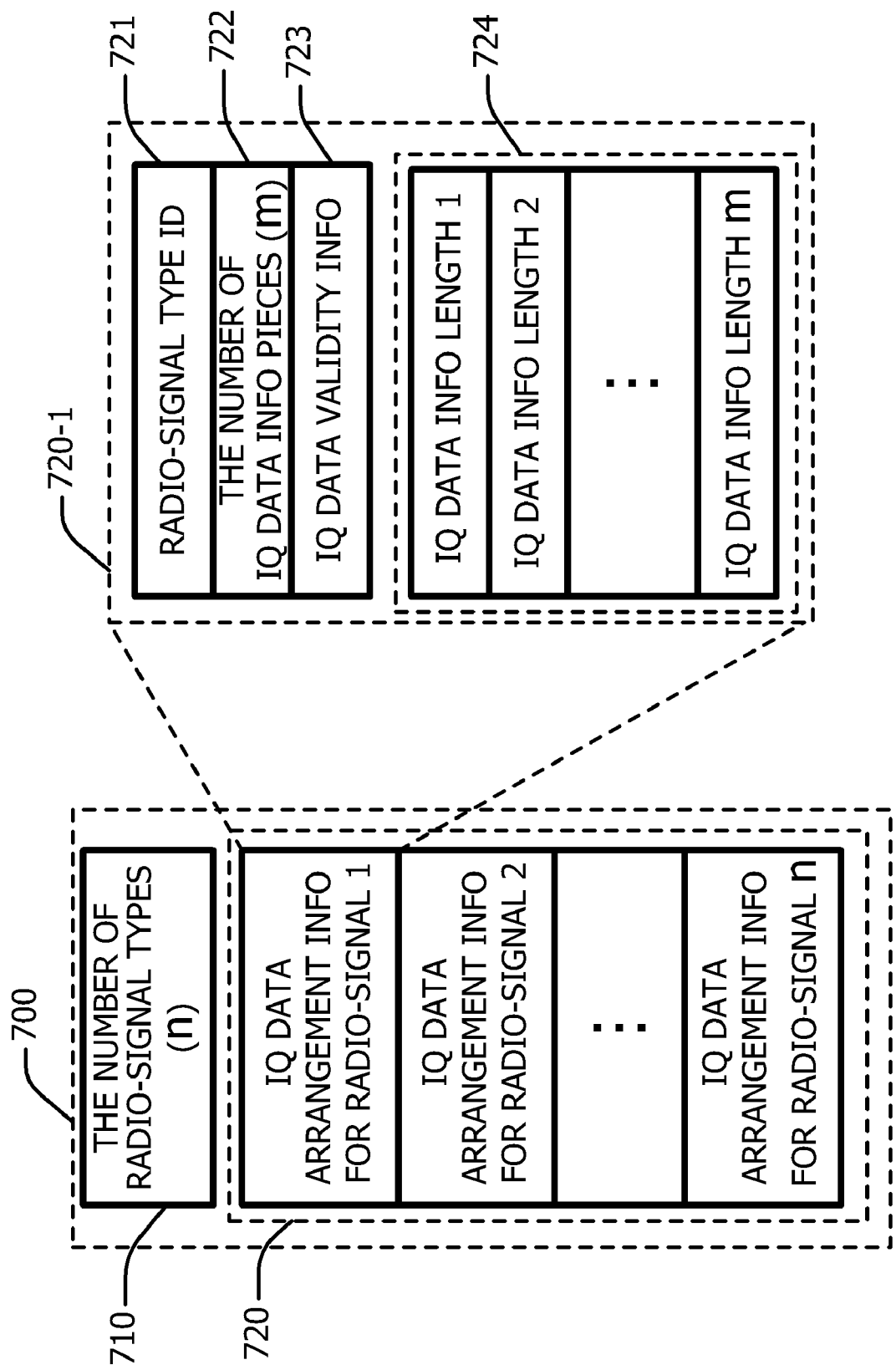
FIG. 13 is a diagram illustrating an example of a configuration of bitmap information, according to an embodiment.

FIG. 13 is a diagram illustrating an example of a configuration of bitmap information, according to an embodiment.

Bitmap information 700 includes the number of radio-signal types 710 (n) and an IQ data arrangement information portion 720 which includes IQ data arrangement information 720-1, 2, . . . , n corresponding respective types of radio signals.

The IQ data arrangement information includes a radio-signal type ID 721, the number of IQ data information 722, IQ data validity information 723, and an IQ data information length storing portion 724.

Herein, the IQ data validity information 723 indicates whether or not the IQ data information is valid. For example, by correlating IQ data information with validity bit indicating whether or not the IQ data information is valid, the IQ data validity information 723 can be structured as a set of validity bits. For example, when a value of a validity bit is 1, the corresponding IQ data information is set as valid and, when a value of a valid bit is "0", the corresponding IQ data information is set as invalid.

The IQ data information length storing portion 724 includes bit lengths of one or more pieces of IQ data information, which are arranged in the order of arrangement of the one or more pieces of IQ data information in the IQ data block. Therefore, combining or decomposing of IQ data can be performed by sequentially referring to the sequence of lengths of IQ data information which is stored in the IQ data information length storing portion 724, and by sequentially performing setting or extracting of IQ data information from the top of the IQ data block.

Figure 14:
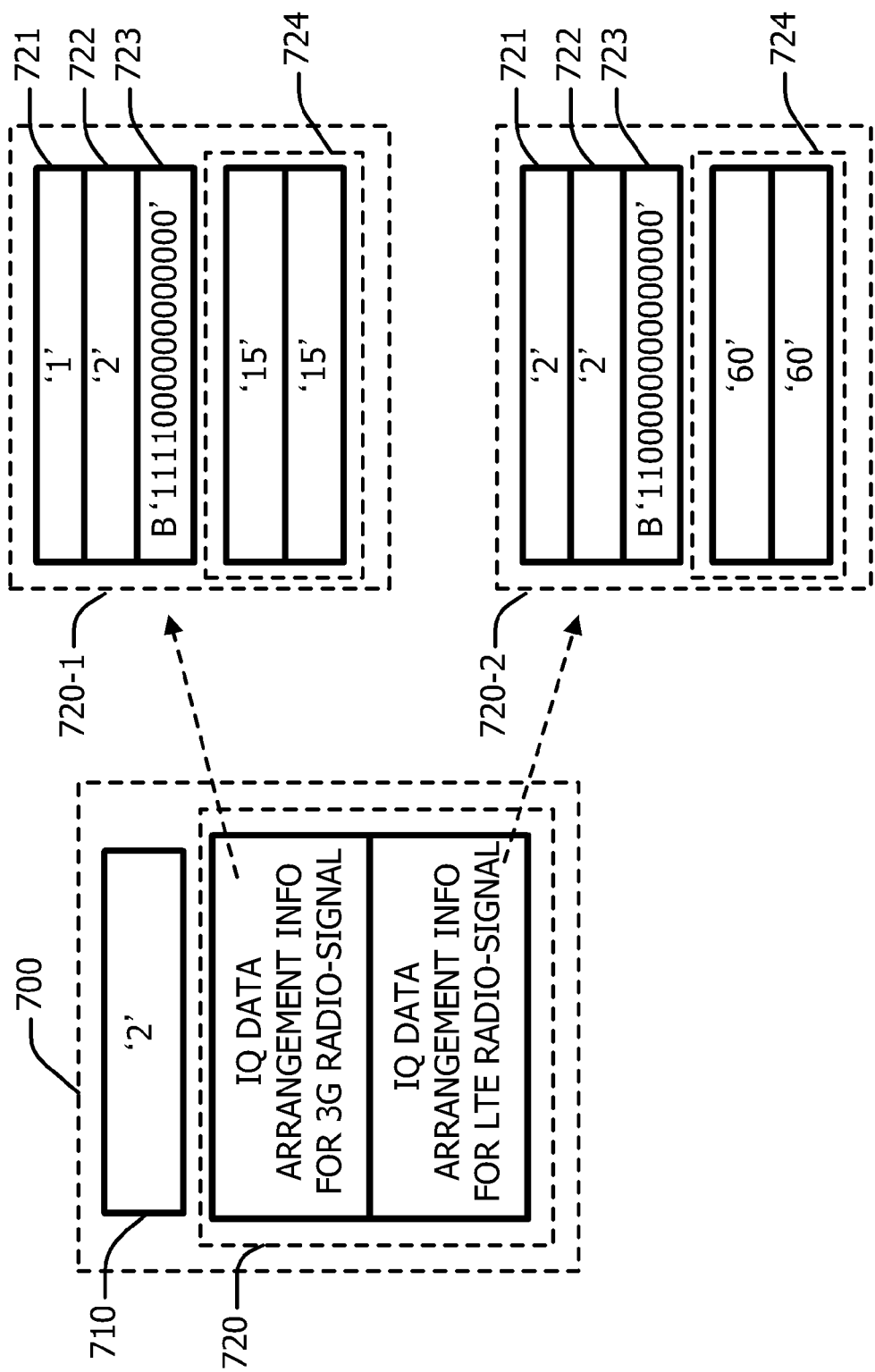
FIG. 14 is a diagram illustrating an example of bitmap information, according to an embodiment.

FIG. 14 is a diagram illustrating an example of bitmap information, according to an embodiment.

In the case of the IQ data block as depicted in FIG. 12, the radio signal identification ID of the 3G system is set as "1", and the radio signal identification ID of the LTE system is set as "2". Then, the bitmap information can be expressed with a value as depicted in FIG. 14. In the case, the IQ data arrangement information of the 3G radio signal 720-1 includes information on two pieces of IQ data information each having a length of 30 bits. The IQ data arrangement information of the LTE radio signal 720-2 includes information on two pieces of IQ data information each having a length of 60 bits. In FIG. 14, expression B '. . .' means that ". . ." is a binary numeral.

As depicted in FIGS. 13 and 14 mentioned above, the bitmap information is configured by simply arranging one or more pieces of IQ data arrangement information for each of types of radio signals without change. Therefore, a plurality of pieces of bitmap information for a plurality of types of radio signals can be combined and decomposed extremely easily. According to the embodiment, IQ data blocks can be combined and decomposed efficiently on the basis of the bitmap information with a simple structure.

Figure 15:
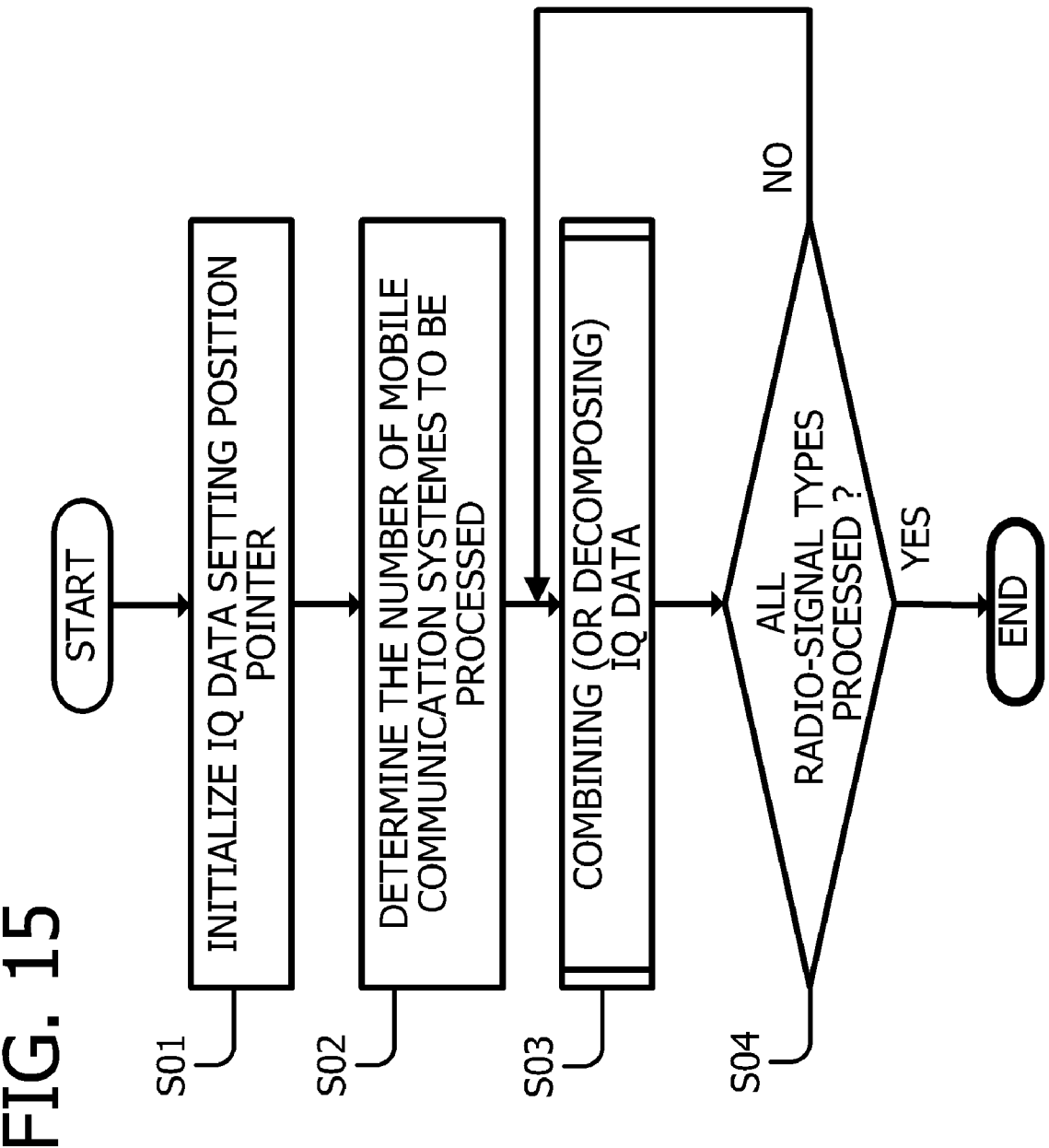
FIG. 15 is a diagram illustrating an example of an operational flow for combining and decomposing data, according to an embodiment.

FIG. 15 is a diagram illustrating an example of an operational flow for combining and decomposing data, according to an embodiment, in which a flow upon combining (or decomposing) IQ data of a plurality of types of radio signals into one IQ data block. Herein, an example will be described of combining IQ data blocks of a plurality of different types of radio signals into one IQ data block. The process for decomposing the IQ data block obtained by combining IQ data blocks of a plurality of different types of the radio signals into respective IQ data blocks of different types of radio signals on the basis of the bitmap information, can be realized by the similar processing flow. That is, as described in the parenthesis in FIG. 16, the decomposing process may be realized by replacing a portion expressed as the "set" with "extract" in FIG. 16.

In step S01, an IQ data setting position pointer, which is a positional pointer in an IQ data block upon setting the IQ data information to the IQ data block, is initialized.

In step S02, the number of radio-signal types is obtained from the bitmap information, so as to determine the number of mobile communication systems to be processed.

In step S03, one type of radio signal is selected from the bitmap information, and processing for combining the IQ data information with respect to the selected type of the radio signal is performed. The details thereof will be described with reference to FIG. 16 later.

In step S04, it is determined whether or not the processing of all the types of the radio signals has ended. When the processing of all the types of the radio signals has ended (YES), the processing ends. Otherwise (NO), the processing returns to step S03 so as to continue processing for combining IQ data information of the next type of the radio signals.

Figure 16:
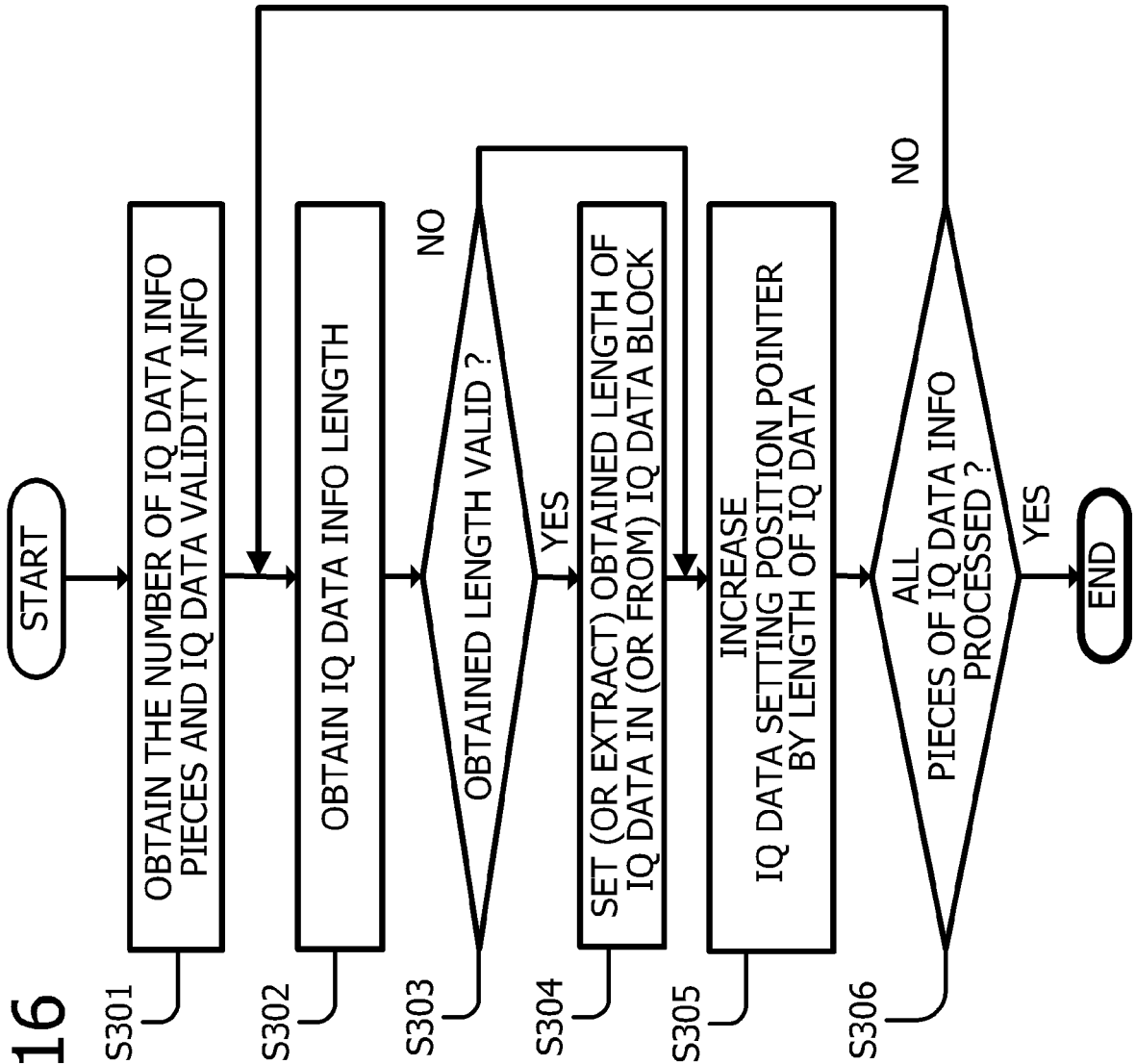
FIG. 16 is a diagram illustrating an example of an operational flow for combining and decomposing data, according to an embodiment.

FIG. 16 is a diagram illustrating an example of an operational flow for combining and decomposing data, according to an embodiment, in which the details of the processing in step S03 depicted in FIG. 15 is described.

In step S301, the number of pieces of IQ data information and the IQ data validity information are obtained from the IQ data arrangement information of the corresponding radio-signal type ID in the bitmap information 700.

In step S302, the length of the IQ data information is sequentially obtained from the top of the IQ data information length storing part 724 included in the IQ data arrangement information.

In step S303, it is determined on the basis of the IQ data validity information 723 whether or not the obtained length of the IQ data information is valid. When it is determined that it is valid (YES), the processing advances to next step S304. When it is determined that it is not valid (NO), the processing shifts to step S305.

In step S304, the IQ data having a bit length indicated by the length of the IQ data information obtained in step S302 is set to the IQ data block.

In step S305, the IQ data setting position pointer is increased by a bit length indicated by the length of the IQ data information.

In step S306, it is determined, on the basis of the number of the IQ data information, whether or not processing of all the pieces of IQ data information has ended. When the processing of all the pieces of IQ data information has ended (YES), the processing ends. When the processing of all the pieces of IQ data information has not ended (NO), the processing returns to step S302 so as to perform the processing on the next IQ data information.

With the processing depicted in FIGS. 15 and 16, two pieces of IQ data for a 3G system and a LTE system depicted in FIGS. 5 and 6 are arranged and combined into an IQ data block as depicted in FIG. 12. In the case, bitmap information depicted in FIG. 14 is also simultaneously combined.

On the other hand, an IQ data block depicted in FIG. 12 can be decomposed into two IQ data blocks for the 3G system and the LTE system depicted in FIGS. 5 and 6 on the basis of the bitmap information depicted in FIG. 14.

As mentioned above, a plural pieces of IQ data information are arranged in an IQ data block by combining the plural pieces of IQ data of different types of radio signals on the basis of the bitmap information, thereby allowing transmitting a plural pieces of IQ data of different types of radio signals using the same IQ data block. Thus, as depicted in FIG. 8, the shared RE 30 for supporting mobile terminals of different mobile communication systems can be configured and the IQ data can be transmitted and received between the shared RE 30 and a REC disposed to each of the mobile communication systems by one CPRI link.

Figure 17:
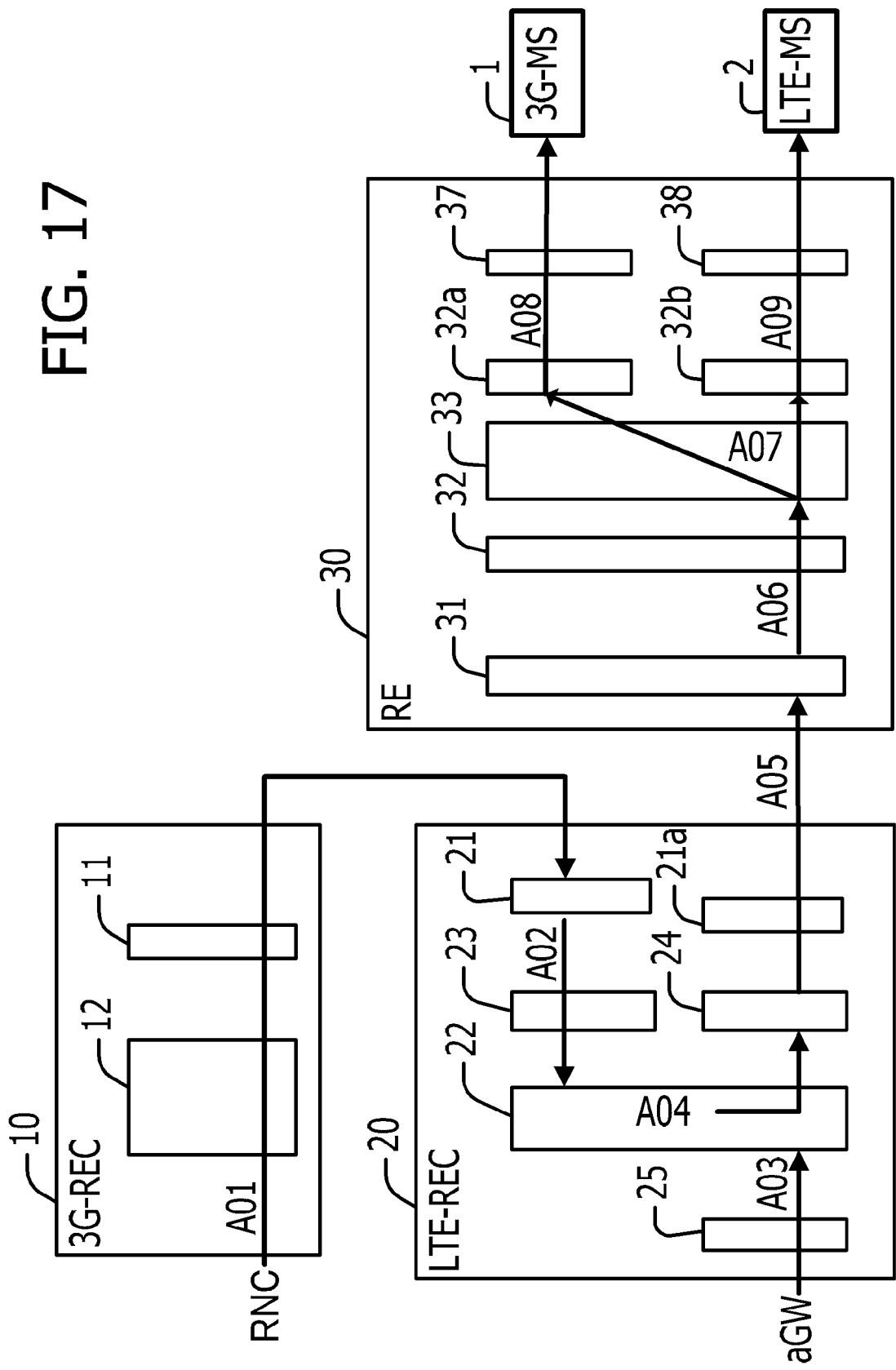
FIG. 17 is a diagram illustrating an example of a transfer sequence of data, according to an embodiment.

FIG. 17 is a diagram illustrating an example of a transfer sequence of data, according to an embodiment, in which transfer steps are denoted by symbols A01 to A09. In FIG. 17, when the data (IQ data) transmitted from the 3G-REC 10 and the data (IQ data) originating from the LTE-REC 20 are combined to be transmitted to the RE 30, and the RE 30 decomposes the received IQ data to transmit the decomposed IQ data to mobile terminal 1 (3G-MS) for the 3G system and mobile terminal 2 (LTE-MS) for the LTE system.

In step A01, upon receiving IQ data from the upper device (RNC), a bitmap information input/output part 12 in the 3G-REC 10 generates bitmap information, inserts the generated bitmap information into a specific address of a VS frame of the CPRI, and transmits the inserted bitmap information together with the IQ data frame to the LTE-REC 20 via a CPRI communication part 11.

In step A02, the CPRI communication part 21 in the LTE-REC 20 sends the received frame of the CPRI to a bitmap information input/output 23. The bitmap information input/output 23 picks up an IQ data block from the IQ data frame of the CPRI, extracts bitmap information from the specific address of the VS frame, and sends the extracted IQ data block and the bitmap information to an IQ data combining/decomposing part 22.

In step A03, when a bitmap information input/output part 25 in the LTE-REC 20 receives IQ data from the upper device (aGW) simultaneously with the step A02, the bitmap information input/output part 25 generates the bitmap information, and sends the generated bitmap information and received IQ data to the IQ data combining/decomposing part 22.

In step A04, the IQ data combining/decomposing part 22 combines the bitmap information of the 3G system received in the step A02 and the bitmap information of the LTE system received in the step A03 into new bitmap information. Further, a new IQ data block is generated by calculating and setting the bit position corresponding to the IQ data, on the basis of the new bitmap information.

Then, the IQ data combining/decomposing part 22 sends the new bitmap information and the new IQ data block to a bitmap information input/output part 24.

In step A05, upon receiving the bitmap information, the bitmap information input/output part 24 inserts the received bitmap information to a specific address of the VS frame of the CPRI, outputs the inserted bitmap information together with the IQ data frame to the CPRI communication part 21a, so as to be transmitted to the RE 30.

In step A06, the CPRI communication part 31 in the RE 30 sends the received CPRI signal to a bitmap information input/output part 32. The bitmap information input/output part 32 extracts the bitmap information from a predetermined address of the VS frame of the CPRI signal, extracts the IQ data block from the IQ data frame, and sends the extracted IQ data block to an IQ data combining/decomposing part 33.

In step A07, the IQ data combining/decomposing part 33 decompose the received IQ data block into two IQ data blocks for the 3G system and the LTE system on the basis of the received bitmap information (including the bitmap information of the 3G system and the LTE system). Further, the transmitting destination of the IQ data is recognized on the basis of the radio signal identification ID extracted from the bitmap information. When the destination is the 3G system, the decomposed bitmap information of the 3G system and the decomposed IQ data of the 3G system are sent to the bitmap information input/output part 32a. Similarly, when the destination is the LTE system, the decomposed bitmap information of the LTE system and the decomposed IQ data of the LTE system are sent to the bitmap information input/output part 32b.

In step A08, the bitmap information input/output part 32a sends the received IQ data to the 3G radio communication part 37, and the 3G radio communication part 37 transmits the received IQ data to the 3G mobile terminal 1 (3G-MS) with a predetermined radio signal.

In step A09, the bitmap information input/output part 32b sends the IQ data of the LTE system to the radio communication part 38, and the LTE radio communication part 38 transmits the received IQ data to the LTE mobile terminal 2 (LTE-MS) with a predetermined radio signal.

Figure 18:
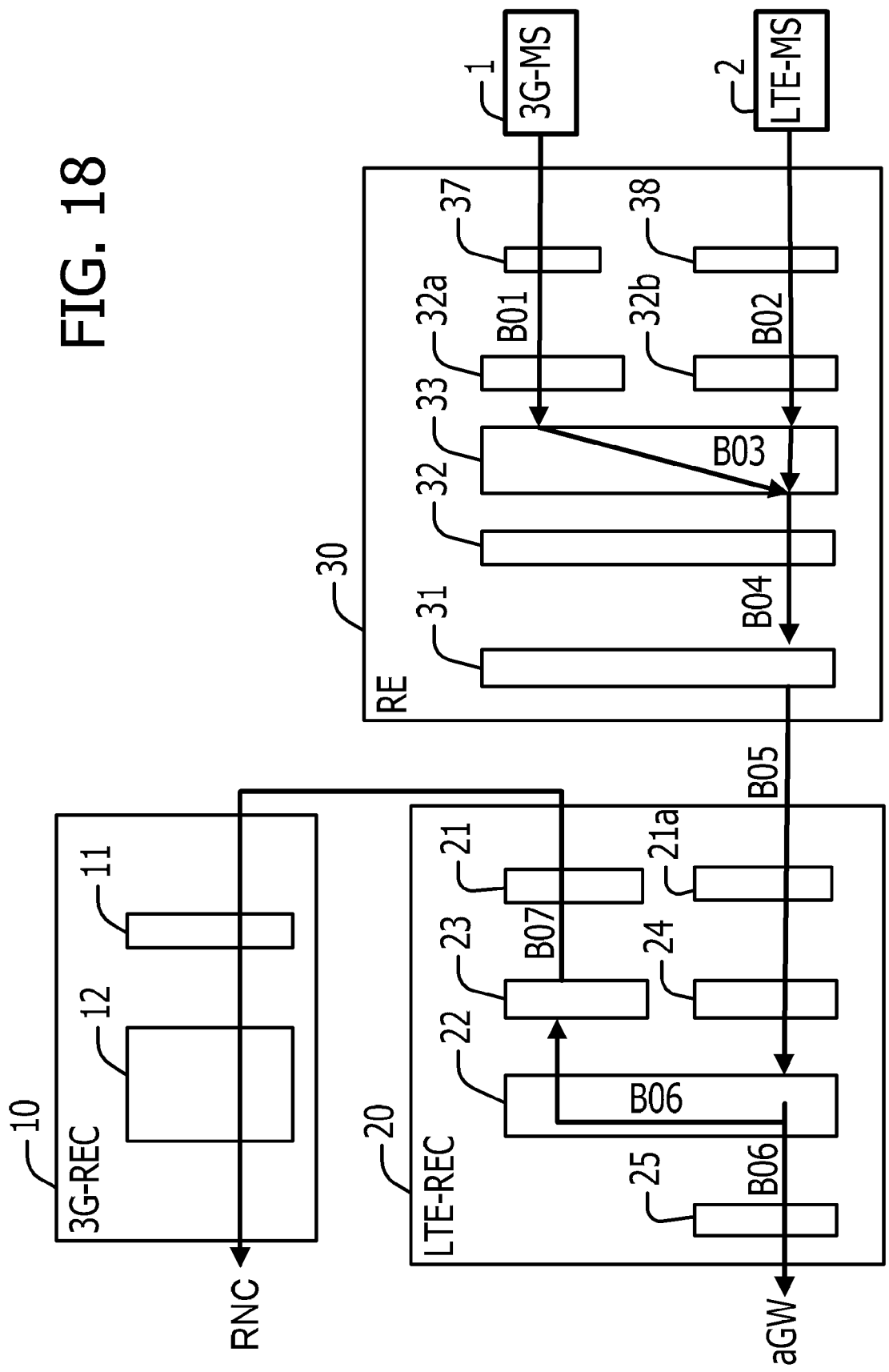
FIG. 18 is a diagram illustrating an example of a transfer sequence of data, according to an embodiment.

FIG. 18 is a diagram illustrating an example of a transfer sequence of data, according to an embodiment, in which transfer steps are denoted by symbols B01 to B07. In FIG. 18, a flow of the data (IQ data) is depicted when the RE 30 simultaneously receives two radio signals by from the 3G mobile terminal 1 (3G-MS) and the LTE mobile terminal 2 (LTE-MS).

In step B01, upon receiving the predetermined radio signal from the 3G mobile terminal 1 (3G-MS), the 3G radio communication part 37 in the RE 30 sends the IQ data included in the received radio signal to the bitmap information input/output part 32a. The bitmap information input/output part 32a adds the bitmap information to the received IQ data, and sends the IQ data with the bitmap information to the IQ data combining/decomposing part 33.

In step B02, upon receiving the predetermined radio signal from the LTE mobile terminal 2 (LTE-MS), concurrently with the processing of the above step B01, the LTE radio communication part 38 in the RE 30 sends the IQ data included in the received radio signal to the bitmap information input/output part 32b. The bitmap information input/output part 32b adds the bitmap information to the received IQ data, and sends the IQ data with the bitmap information to the IQ data combining/decomposing part 33.

In step B03, the IQ data combining/decomposing part 33 combines the received two pieces of bitmap information of the 3G system and the LTE system into a new piece of bitmap information, generates a new piece of IQ data by combining the received two pieces of IQ data on the basis of the combined new piece of bitmap information, and sends the generated new piece of IQ data to the bitmap information input/output part 32.

In step B04, the bitmap information input/output part 32 inserts the received bitmap information and IQ data into the CPRI signal to be transmitted to the LTE-REC 20 via the CPRI communication part 31.

In step B05, the CPRI signal transmitted from the RE 30 is received by the CPRI communication part 21a in the LTE-REC 20, and the bitmap information and the IQ data are extracted from the CPRI signal by the bitmap information input/output part 24 so as to be sent to the IQ data combining/decomposing part 22.

In step B06, the IQ data combining/decomposing part 22 decomposes the received IQ data into parts corresponding to respective types of the radio signals on the basis of the bitmap information. Further, the IQ data of the LTE system is sent to the bitmap information input/output part 25, and the IQ data of the 3G system is sent to the bitmap inserting/decomposing part 23. The IQ data sent to the bitmap information input/output part 25 is transmitted to the upper device (aGW) of the LTE system (not depicted in FIG. 18).

In step B07, the IQ data sent to the bitmap information input/output 23 is transmitted to the 3G-REC 10 via the CPRI communication part 21, so as to be transmitted to the upper device (RNC) of the 3G system (not shown) via the bitmap information input/output part 12 of the 3G-REC 10.

Figure 19:
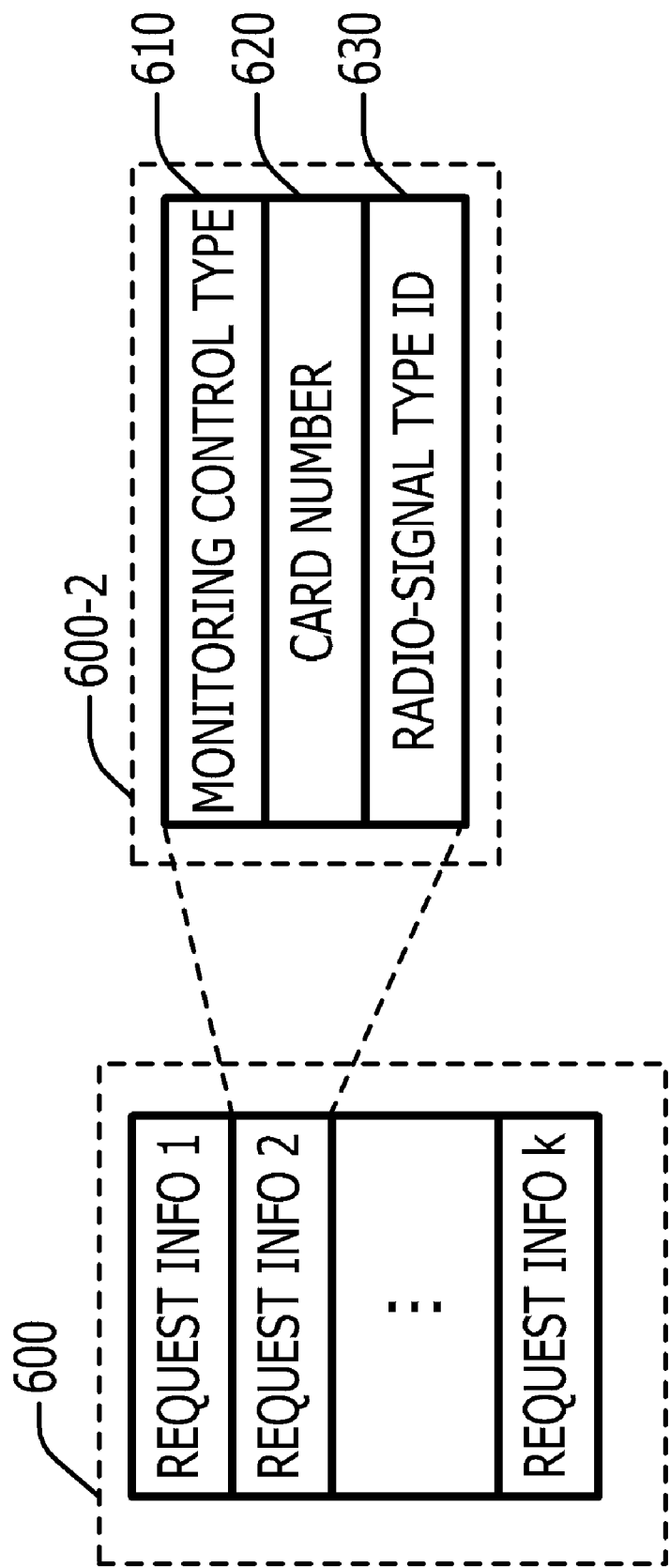
FIG. 19 is a diagram illustrating an example of a configuration of monitoring control data, according to an embodiment.

FIG. 19 is a diagram illustrating an example of a configuration of monitoring control data, according to an embodiment, which is request data transmitted from a radio equipment control (REC) to a radio equipment (RE) via a communication link of the CPRI when the REC issues a request for maintenance and monitoring to the RE.

A piece of request data 600 includes at least one piece of request information, and each piece of request information (for example, 600-2) includes a monitoring control type 610, a card number 620, and a radio-signal type ID 630.

For example, when simultaneously monitoring states of both the mobile terminal 1 (3G-MS) of the 3G system and the mobile terminal 2 (LTE-MS) of the LTE system, predetermined code indicating a "state reporting request" is set to the monitoring control type 610, and an identification number of a card, of which the state is to be reported, is set to the card number 620. Further, information for identifying the type of the radio signal related to the card, i.e., information for identifying whether the radio signal of the 3G system or the radio signal of the LTE system, is set to the radio-signal type ID 630. When request data 600 includes a plurality of pieces of request information, the RE 30 divides the received request data 600 into pieces of request information according to a radio signal identification ID, performs processing matching the type of the radio signal, and returns the result of the processing as response data to the REC corresponding to the type of the radio signal.

Figure 20:
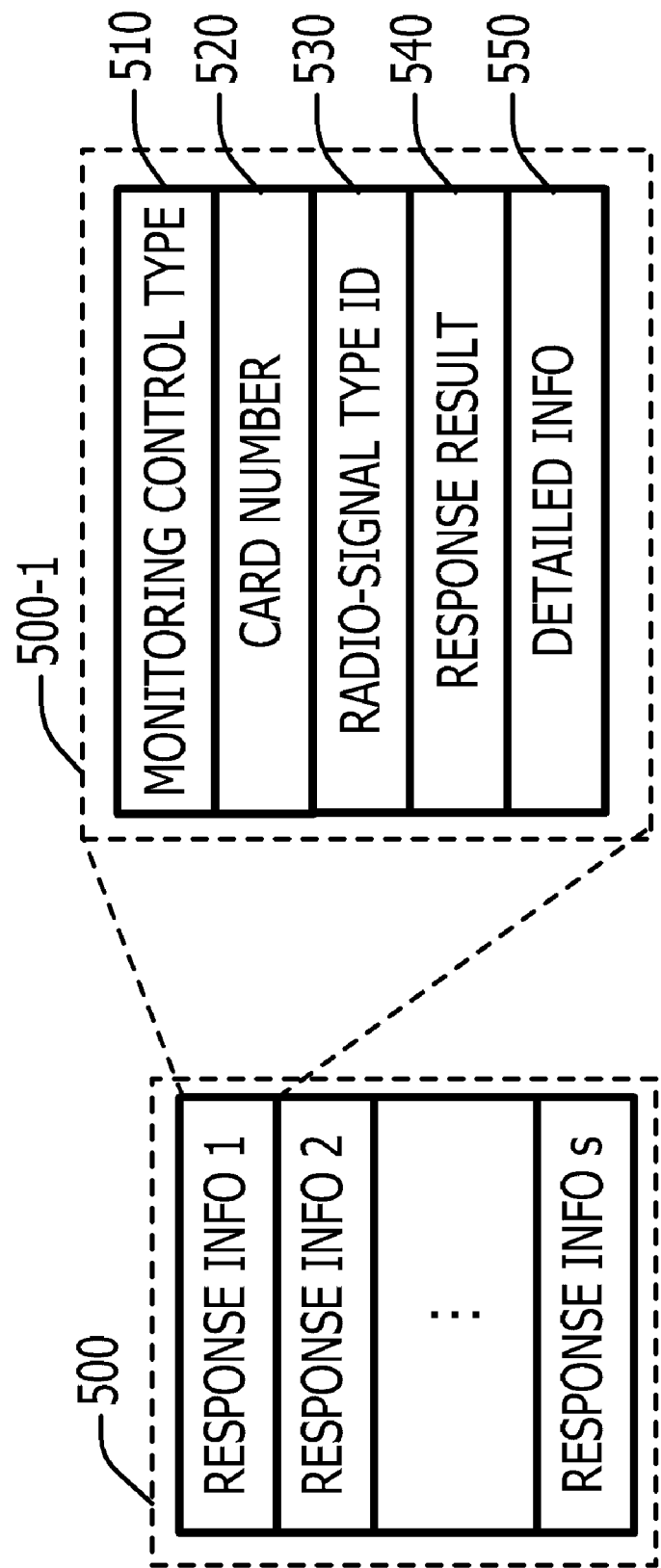
FIG. 20 is a diagram illustrating an example of a configuration of monitoring control data, according to an embodiment.

FIG. 20 is a diagram illustrating an example of a configuration of monitoring control data, according to an embodiment, which is response data transmitted from a radio equipment (RE) in response to the request data depicted in FIG. 19.

Response data 500 includes at least one piece of response information. Response information (for example, 500-1) includes: a monitoring control type 510; a card number 520; a radio-signal type ID 530; a response result 540; and detailed information 550. Code information for identifying the type of the response information is set to the monitoring control type 510. For example, when request data requesting a report on the status about a card of the 3G system, is transmitted to the RE 30, code information indicating the response of a card state report is set to the monitoring control type 510, the card number of the card is set to 520, and the radio-signal type ID "1" indicating a radio signal of the 3G system is set to 530. Further, information indicating OK or NG is set to the response result 540, and a detailed code indicating the state is set to the detailed information 550. Then, the response data including the above mentioned data set thereto is returned to the REC.

When the RE 30 handles a plurality of types of radio signals (e.g., the 3G system and the LTE system), response data in which plural pieces of response information on a plurality of types of the radio signals are mixed, is returned to the REC. In a REC according to the embodiment, the plural pieces of mixed response information in the response data are decomposed into pieces of response information corresponding to the respective types of radio signals, and the pieces of response information are distributed to the respective RECs each capable of handling the corresponding radio signal.

With the configuration of monitoring control data depicted in FIGS. 19 and 20, monitoring control data including information on a plurality of types of radio signals can be transmitted and received between the 3G-REC 10, the LTE-REC 20, and the RE 30, by using one communication link as described above with reference to FIG. 8. Here, the monitoring control data can be transmitted by using the HDLC frame prescribed by the CPRI.

Figure 21:
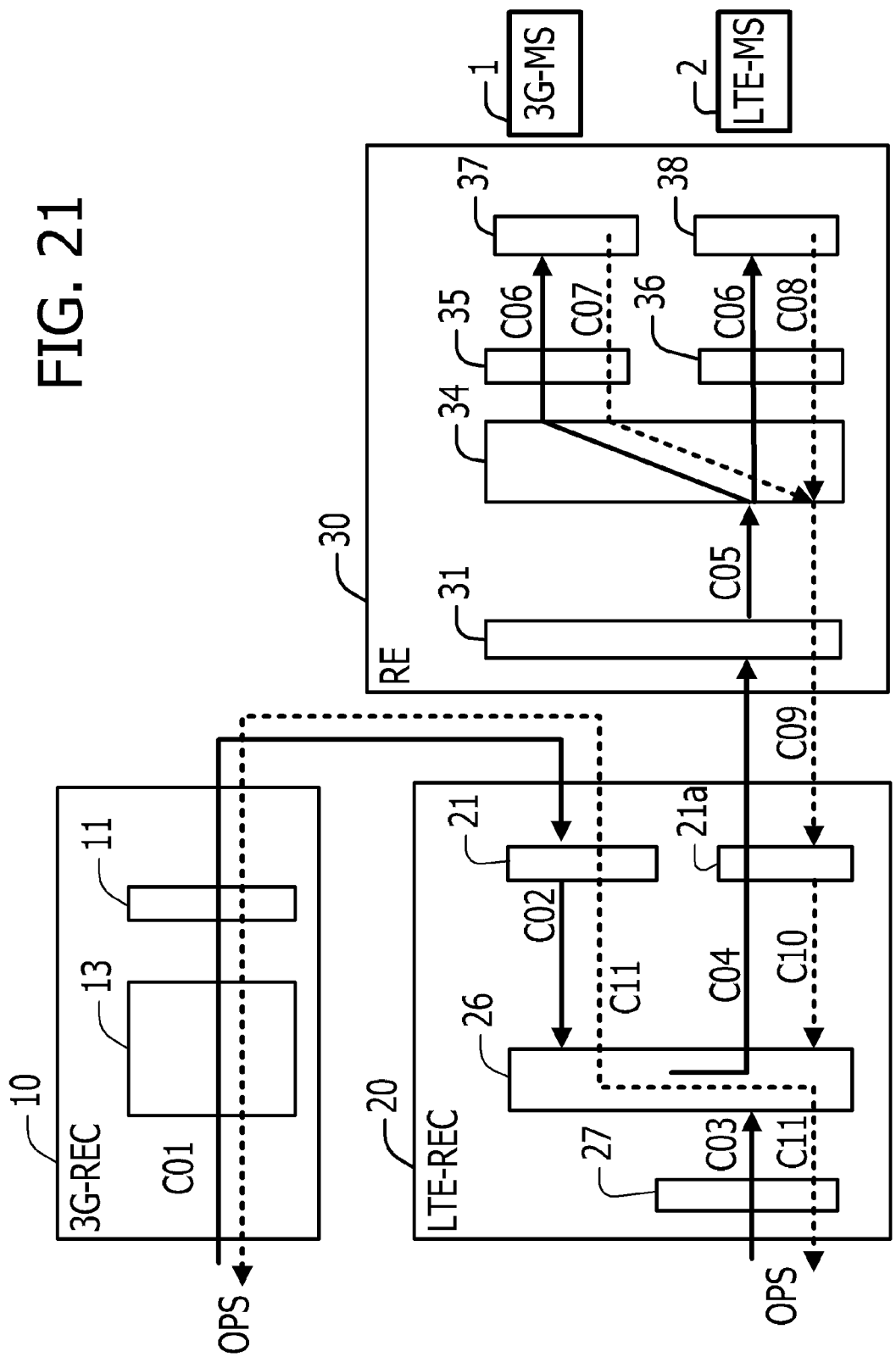
FIG. 21 is a diagram illustrating an example of a transfer sequence of monitoring control data, according to an embodiment.

FIG. 21 is a diagram illustrating an example of a transfer sequence of monitoring control data, according to an embodiment, in which symbols C01 to C11 denote transfer steps when two pieces of request data requesting a report on a card state of a RE are transmitted, to the RE 30, simultaneously from both the 3G-REC 10 and the LTE-REC 20. Here, for convenience of explanation, request data is depicted by a solid arrow, and response data is depicted by a dotted arrow.

In step C01, in order to transmit to the RE 30 request data as monitoring control data for a request, a 3G monitoring control part 13 in the 3G-REC 10 generates the request data added with a radio-signal type ID indicating the 3G system, and transmits the generated request data to the LTE REC 20 via the CPRI communication part 11. The monitoring control data of the request data is stored in the HDLC frame of the CPRI to be transmitted.

In step C02, upon receiving the CPRI signal including the request data, the CPRI communication part 21 in the LTE-REC 20 sends the received request data to the monitoring control data combining/decomposing part 26.

In step C03, upon receiving, simultaneously with the step C01, request for reporting the status of the RE card from the operation system (OPS) connected to the LTE-REC 20, the LTE-REC 20 generates request data added with the radio-signal type ID indicating the LTE system, and sends the generated data to the monitoring control data combining/decomposing part 26.

In step C04, the monitoring control data combining/decomposing part 26 combines the request data of the 3G system received in step C02 and the request data of the LTE system received in step C03, into new combined request data, and transmits the new combined request data to the RE 30 via the CPRI communication part 21a.

In step C05, the CPRI communication part 31 in the RE 30 sends the CPRI signal including the received combined request data to the monitoring control data combining/decomposing part 34.

In step C06, the monitoring control data combining/decomposing part 34 decomposes the combined request data into pieces of data corresponding to the respective radio-signal types. Further, by referring to a radio-signal type ID and a type of monitoring and control are determined, it is determined what request is transmitted from which system and whether or not a priority control is required.

For example, when two types of both the request data from the 3G system (i.e., transmitted from the 3G-REC 10) and of the request data from the LTE system (i.e., transmitted from the LTE-REC 20) indicate request data requesting a report on a card state of the RE 30, it is determined that the priority control does not need to be performed, and then the request data of the 3G system is sent to the 3G monitoring control part 35 while the request data of the LTE system is sent to the LTE monitoring control part 36.

In steps C07 and C08, upon receiving the request data, the 3G monitoring control part 35 and the LTE monitoring control part 36 perform processing in accordance with the received request data, set the result of the processing to response data which is sent to the monitoring control data combining/decomposing part 34.

In step C09, the monitoring control data combining/decomposing part 34 receives two pieces of response data from the 3G monitoring control part 35 and the LTE monitoring control part 36, combines the received two pieces of response data into new combined response data which is transmitted to the LTE-REC 20 via the CPRI communication part 31.

In step C10, the CPRI communication part 21a in the LTE-REC 20 receives the CPRI signal including the combined response data from the RE 30, and then sends the received combined response data to the monitoring control data combining/decomposing part 26.

In step C11, the monitoring control data combining/decomposing part 26 decomposes the combined response data into pieces of response data corresponding to the respective radio-signal types. Then, in the case, the monitoring control data combining/decomposing part 26 transmits one piece of response data for the 3G system to the 3G-REC 10 via the CPRI communication part 21, and sends the other piece of response data for the LTE system to the LTE monitoring control part 27. The LTE monitoring control part 27 transmits the related information to the operation system (OPS) connected to the LTE-REC 20 on the basis of the received response data. On the other hand, the 3G monitoring control part 13 in the 3G-REC 10 transmits the related information to the operation system (OPS) connected to the 3G-REC 10 on the basis of the response data transmitted from the LTE-REC 20.

Figure 22:
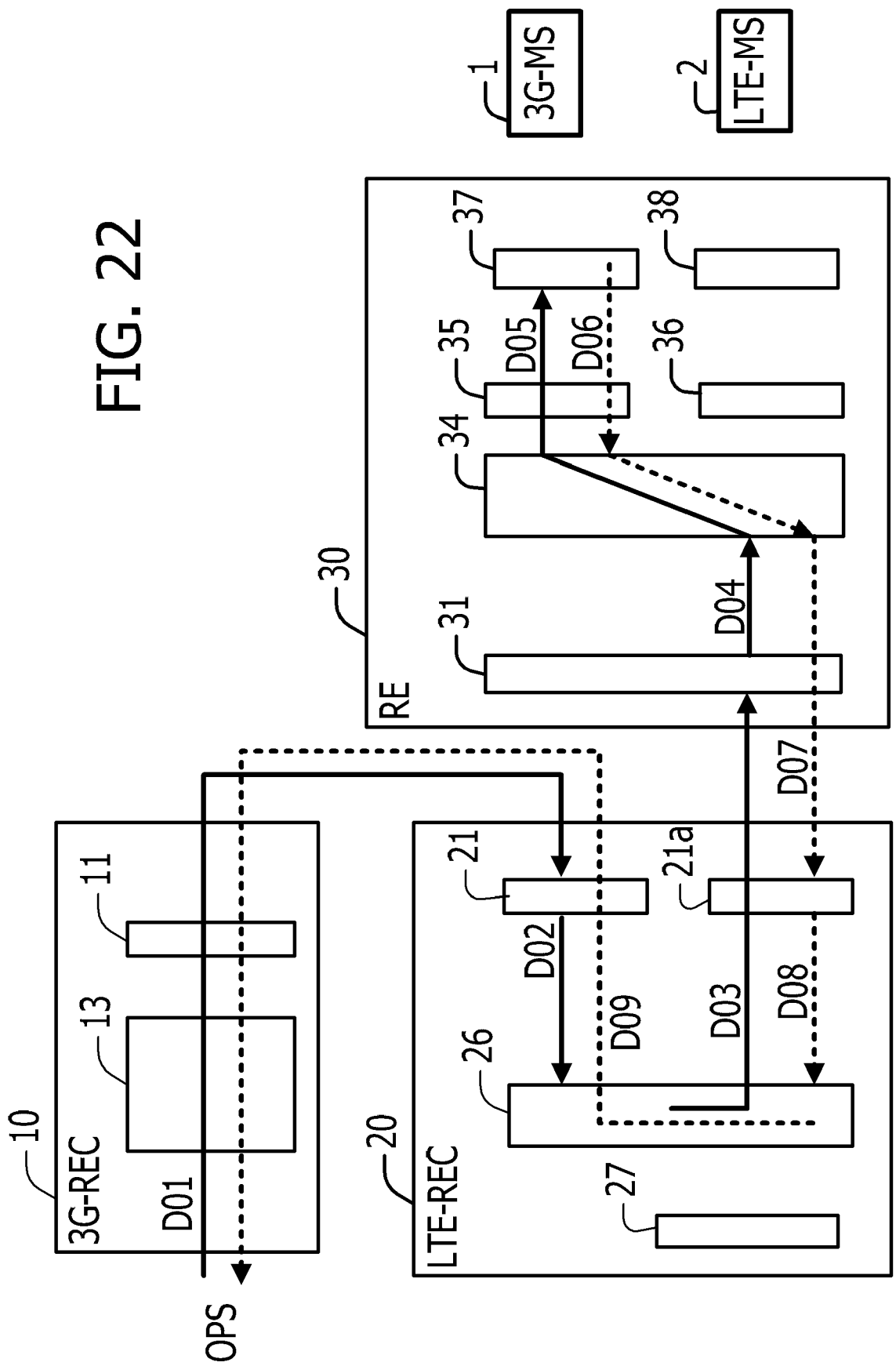
FIG. 22 is a diagram illustrating an example of a transfer sequence of monitoring control data, according to an embodiment.

FIG. 22 is a diagram illustrating an example of a transfer sequence of monitoring control data, according to an embodiment, in which symbols D01 to D09 denote transfer steps when only one piece of request data is transmitted from the 3G-REC 10 to the RE 30. Here, for convenience of explanation, request data is depicted by a solid arrow, and response data is depicted by a dotted arrow.

In step D01, a 3G monitoring control part 13 in the 3G-REC 10 transmits request data for controlling a card in the RE 30 in accordance with an instruction given by an operation system (OPS) (not depicted in FIG. 22). In this case, identification information indicating the 3G system is set to the radio-signal type ID in the request data. The request data is transmitted to the LTE-REC 20 via the CPRI communication part 11.

In step D02, the CPRI signal including the request data transmitted in the step D01 is received by the CPRI communication part 21 in the LTE-REC 20, and is sent to the monitoring control data combining/decomposing part 26.

In step D03, the monitoring control data combining/decomposing part 26 transmits the request data received from the CPRI communication part 21 to the RE 30 via the CPRI communication part 21a. This case is different from the case depicted in FIG. 21, and the request data from the LTE monitoring control part 27 does not exist. Therefore, the request data as monitoring control data is not combined.

In step D04, the CPRI communication part 31 in the RE 30 receives the CPRI signal including the request data, and then outputs the request data to the monitoring control data combining/decomposing part 34.

In step D05, the monitoring control data combining/decomposing part 34 determines, by referring to the radio-signal type ID included in the request data and the type of monitoring and control, which request is transmitted from which system. In this case, since only the request data from the 3G system is received, the request data of the 3G system is sent to the 3G monitoring control part 35.

In step D06, upon receiving the request data, the 3G monitoring control part 35 performs processing corresponding to the request data, and sets the processing result to response data which is sent to the monitoring control data combining/decomposing part 34. At this time, identification code (e.g., 1) indicating the 3G system is set to the radio-signal type ID in the response data.

In step D07, the monitoring control data combining/decomposing part 34 receives the response data for the 3G system, and transmits the response data to the LTE-REC 20 via the CPRI communication part 31.

In step D08, the CPRI communication part 21a in the LTE-REC 20 that has received the CPRI signal including the response data, sends the response data to the monitoring control data combining/decomposing part 26.

In step D09, since the monitoring control data combining/decomposing part 26 receives the response data in response to the request data from the 3G system, the monitoring control data combining/decomposing part 26 transmits the response data to the 3G-REC 10 via the CPRI communication part 21. The 3G monitoring control part 13 in the 3G-REC 10 receives the response data, then performs processing corresponding to contents of the response data, and sends the notification to the operation system (OPS) (not depicted in FIG. 22) as needed.

Figure 23:
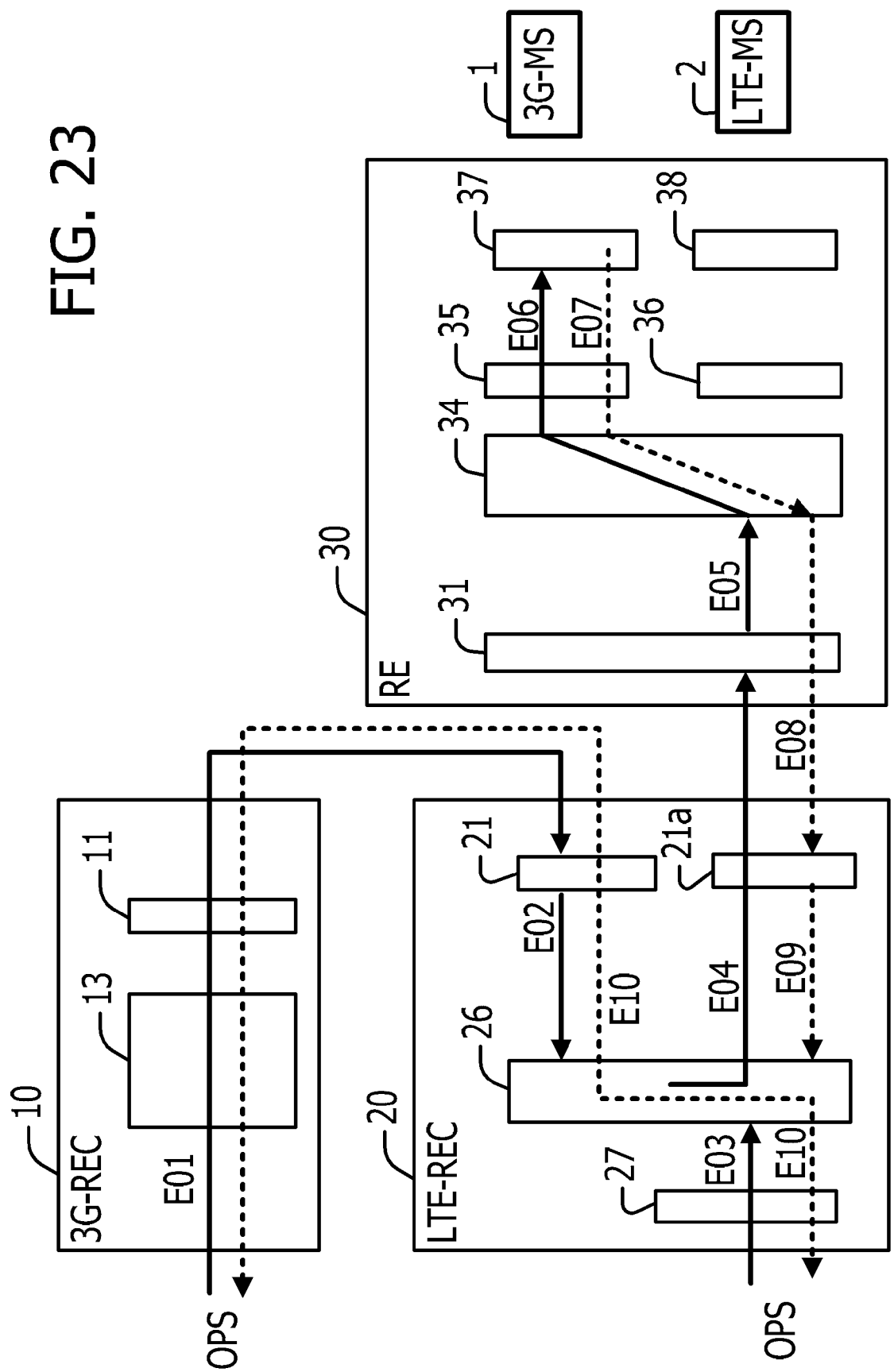
FIG. 23 is a diagram illustrating an example of a transfer sequence of monitoring control data, according to an embodiment.

FIG. 23 is a diagram illustrating an example of a transfer sequence of monitoring control data, according to an embodiment, in which symbols E01 to E10 denote transfer steps when two pieces of request data from both the 3G-REC 10 and the LTE-REC 20 are simultaneously transmitted to the RE 30 and the priority control is performed by the RE 30. Here, for convenience of explanation, request data is depicted by a solid arrow, and response data is depicted by a dotted arrow.

In step E01, in order to transmit request data to the RE 30, the 3G monitoring control part 13 of the 3G-REC 10 generates the request data added with the radio-signal type ID indicating the 3G system, and transmits the generated request data to the LTE-REC 20 via the CPRI communication part 11.

In step E02, the CPRI communication part 21 in the LTE-REC 20 receives the CPRI signal including the request data from the 3G-REC 10, and sends the received request data to the monitoring control data combining/decomposing part 26.

In step E03, upon receiving, simultaneously with the step E02, a request for reporting a card state of the RE from the operation system (OPS) (not depicted in FIG. 23) connected to the LTE-REC 20, the LTE-REC 20 generates the request data added with the radio-signal type ID indicating the LTE system, and sends the generated request data to the monitoring control data combining/decomposing part 26.

In step E04, the monitoring control data combining/decomposing part 26 combines the request data of the 3G system received in step E02 and the request data of the LTE system received in step E03 into new combined request data, and transmits the new combined request data to the RE 30 via the CPRI communication part 21a.

In step E05, the CPRI communication part 31 in the RE 30 sends the received CPRI signal including the combined request data to the monitoring control data combining/decomposing part 34.

In step E06, the monitoring control data combining/decomposing part 34 in the RE 30 decomposes the combined request data into pieces of request data, and determines which request is transmitted from which system and whether or not the priority control is required, by referring to the radio-signal type ID and the type of monitoring and control included in the decomposed pieces request data. For example, when the request data from the 3G system is a system reset request to the RE 30, it is determined that the execution of priority control is needed because the LTE system will be influenced thereby, and the request data of the 3G system is transmitted to the 3G monitoring control part 35, and the request data of the LTE system is discarded, in this case, because of competition with the system reset requested by the request data from the 3G system.

In step E07, upon receiving the request data, the 3G monitoring control part 35 performs processing requested by the request data, sets the result of the processing to response data, and sends the response data including the processing result to the monitoring control data combining/decomposing part 34.

In step E08, upon receiving the response data of the 3G system indicating that the RE 30 has been reset, the monitoring control data combining/decomposing part 34 determines that the notification is needed for the LTE system because the RE 30 has been reset and the signal of the LTE system has been discarded thereby. As a consequence, the response data for the LTE system is generated. Further, the generated response data for the LTE system and the response data from the 3G system are combined into a new combined response data which is transmitted to the LTE-REC 20 via the CPRI communication part 31.

In step E09, the CPRI signal including the combined response data transmitted from the RE 30 is received by the CPRI communication part 21a in the LTE-REC 20, and is sent to the monitoring control data combining/decomposing part 26.

In step E10, the monitoring control data combining/decomposing part 26 decomposes the combined response data into two pieces of response data, transmits one of the two pieces of response data for the 3G system to the 3G-REC 10 via the CPRI communication part 21, and sends the other one of the two pieces of response data for the LTE system to the LTE monitoring control part 27.

The 3G monitoring control part 13 in the 3G-REC 10 and the LTE monitoring control part 27 in the LTE-REC 20 receive the response data and perform processing in accordance with the contents included in the response data.

Figure 24:
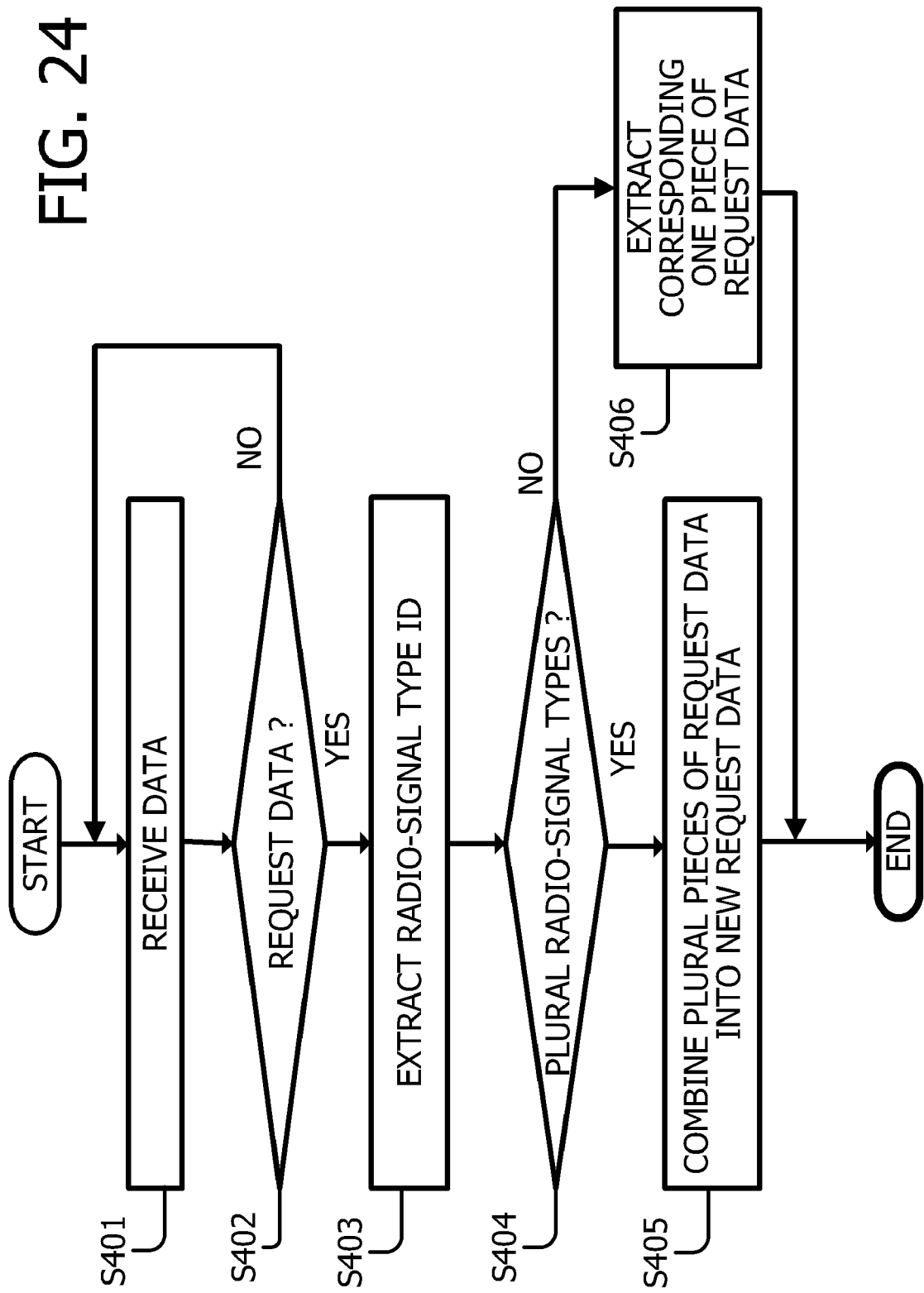
FIG. 24 is a diagram illustrating an example of an operational flow for monitoring and control, according to an embodiment.

FIG. 24 is a diagram illustrating an example of an operational flow for monitoring and control, according to an embodiment, in which a plurality of pieces of request data on a plurality of radio-signal types are combined into one new piece of the monitoring control data by a monitoring control data combining/decomposing part 26 in the LTE-REC 20.

In step S401, data is received.

In step S402, it is determined whether or not request data is received. When request data is received (YES), the processing advances to next step S403. When request data is not received (NO), the processing returns to step S401 so as to receive request data.

In step S403, the radio-signal type ID is extracted from the received request data.

In step S404, it is determined whether or not a plural radio-signal type IDs are included in the received request data. When a plural radio-signal type IDs are included therein (YES), the processing advances to next step S405. When a plural radio-signal type IDs are not included therein (NO), the processing shifts to step S406.

In step S405, a plural pieces of request data on the plural radio-signal type IDs are combined into new request data. Then, the processing ends.

In step S406, the request data corresponding to one radio-signal type ID is extracted, and the processing ends.

Figure 25:
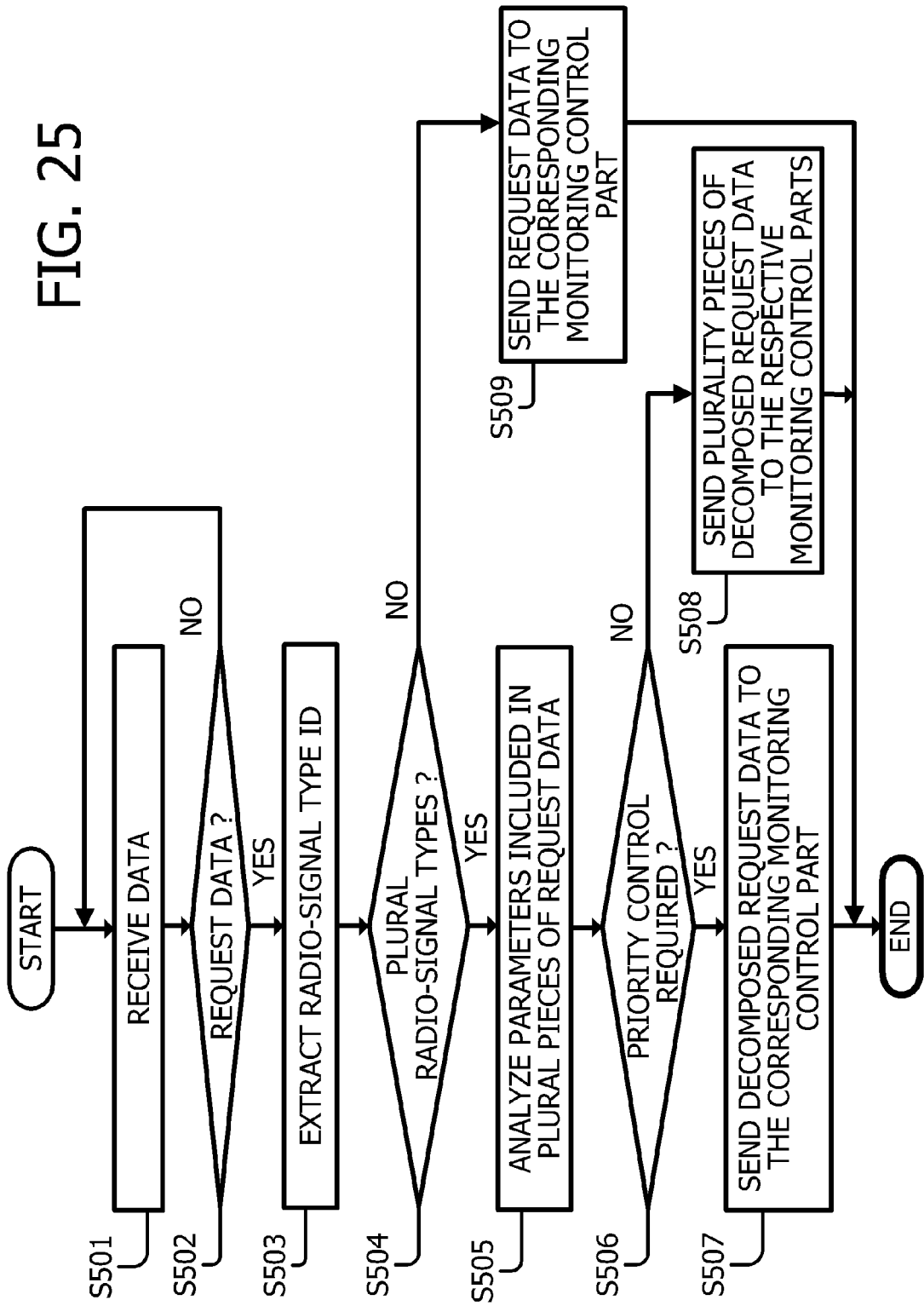
FIG. 25 is a diagram illustrating an example of an operational flow for monitoring and control, according to an embodiment.

FIG. 25 is a diagram illustrating an example of an operational flow for monitoring and control, according to an embodiment, in which a priority control is performed by the monitoring control data combining/decomposing part 34 in the RE 30 that has received the combined request data.

In step S501, data is received.

In step S502, it is determined whether or not request data is received. When request data is received (YES), the processing advances to next step S503. When request data is not received (NO), the processing returns to step S501 so as to receive request data.

In step S503, a radio-signal type ID is extracted from the received request data.

In step S504, it is determined whether or not a plurality of pieces of request data on a plurality of radio-signal types is included the received request data. When a plurality of pieces of request data on a plurality of radio-signal types is included therein (YES), the processing advances to next step S505. When only one piece of request data on one radio-signal type is included therein (NO), the processing shifts to step S509.

In step S505, parameters included in the plurality of pieces of request data are compared with each other and are analyzed. The comparison and analysis are realized by registering parameters needed for the priority control in a table in advance and comparing the parameters with each other.

In step S506, it is determined, on the basis of the analyzed result in step S505, whether or not the priority control is required. When the priority control is required (YES), the processing advances to next step S507. When the priority control is not required (NO), the processing shifts to step S508.

In step S507, a piece of decomposed request data associated with a type of radio signal requiring priority control, is sent to the monitoring control part corresponding to the associated type of radio signal, and the processing ends.

In step S508, a plurality of pieces of request data decomposed in association with a plurality of radio-signal types are sent to the respective monitoring control parts corresponding to the plurality of different radio-signal types, and the processing ends.

In step S509, the request data is sent to the monitoring control part corresponding to the one radio-signal type, and the processing ends.

FIG. 26 is a diagram illustrating an example of an operational flow for monitoring and control, according to an embodiment, in which response data is generated by the monitoring control data combining/decomposing part 34 in the RE 30.

In step S601, response data as a reply to the request data is received from each of monitoring control parts corresponding to the respective radio-signal types.

In step S602, it is determined whether or not all the pieces of response data as a reply to the request data sent just before are received. When all the pieces of response data are received (YES), the processing advances to next step S603. When all the pieces of response data are not received (NO), the processing returns to step S601 so as to receive a next piece of response data.

In step S603, it is determined whether or not the received response data includes plural pieces of monitoring control data on a plurality of radio-signal types. When the received response data includes plural pieces of monitoring control data (YES), the processing advances to next step S604. When the received response data does not include plural pieces of monitoring control data (NO), the processing shifts to step S606.

In step S604, the received pieces of response data are combined into new response data.

In step S605, the new response data is outputted, and the processing ends.

In step S606, it is determined whether or not the received response data is a reply to the request data of priority control. When the received response data is a reply to the request data of priority control (YES), the processing advances to next step S607. When the received response data is not a reply to the request data of priority control (NO), the processing shifts to step S605.

In step S607, response data as a reply to the request data discarded by the priority control is generated, and the generated response data and the received response data are combined into new response data. Then, the processing shifts to step S605.

FIG. 27 is a diagram illustrating an example of an operational flow for monitoring and control, according to an embodiment, in which the combined response data from the RE 30 is received by the monitoring control data combining/decomposing part 26 in the LTE-REC 20.

In step S701, the monitoring control data combining/decomposing part 26 in the LTE-REC 20 receives the response data from the RE 30.

In step S702, it is determined whether or not the received response data is a reply to the request data transmitted just before. When the received response data is a reply to the request data transmitted just before (YES), the processing shifts to next step S703. When the received response data is not a reply to the request data transmitted just before (NO), the processing returns to step S701 so as to wait for receiving response data.

In step S703, the received response data is decomposed into pieces of response data according to the respective radio-signal types thereof.

In step S704, each of the decomposed pieces of response data is sent to the monitoring control part in the REC corresponding to the radio-signal type thereof, and the processing ends.

As described above, according to an embodiment, a plurality of different types of radio signal data can be stored in the same transfer frame so as to be simultaneously transmitted or received.

Further, according to an embodiment, the CPRI specification can be used as a standard transmission method between the radio equipment control (REC) and the radio equipment (RE), thereby efficiently structuring the mobile communication system.

According to another embodiment, the mobile communication system including various mixed types of radio signal can be efficiently configured without depending on the size of IQ data information and the number of pieces of IQ data information which are different in accordance with the type of the used radio signal.

Further, according to an embodiment, a plurality of different types of the data can be transmitted and received between the radio equipment control (REC) and the radio equipment (RE) by one communication link (e.g., CPRI communication link).

That is, the data is received and transmitted between the radio equipment (RE), which is capable of communicate with a plurality of mobile terminals by using a plurality of types of radio signals, and a plurality of radio equipment controls (RECs) provided for the respective types of radio signals, with one communication link chaining the plurality of RECs in a row.

Between the radio equipment controls (RECs) provided corresponding to the mobile communication systems and the shared radio equipment (RE), the data of a plurality of the mobile communication systems can be transmitted and received by using one communication link. Upon structuring a system having different types of the mobile communication systems, the RE does not need to be disposed every mobile communication system, and the base terminal stations corresponding to a plurality of mobile communication systems can be efficiently structured with low costs.

All examples and conditional language recited herein are intended for pedagogical purposes to aid the reader in understanding the embodiment and the concepts contributed by the inventor to furthering the art, and are to be construed as being without limitation to such specifically recited examples and condition, nor does the organization of such examples in the specification relate to a showing of superiority and inferiority of the embodiment. Although the embodiments have been described in detail, it should be understood that the various changes, substitutions, and alternations could be made hereto without departing from the spirit and scope of the invention.

What is claimed is:

1. A method for transmitting a frame storing data included in radio signals between radio equipment for communicating with mobile terminals by using the radio signals and radio equipment controls for processing the radio signals, the method comprising:

generating bitmap information indicating a position in a transfer frame at which data included in a radio signal is arranged;

transmitting the transfer frame storing the data by adding the generated bitmap information thereto;

extracting the data from the transfer frame on the basis of the bitmap information added thereto;

combining first data included in a first radio signal and second data included in a second radio signal that is different in transmission method from the first radio signal, into third data, wherein the third data is combined on the basis of third bitmap information that is obtained by combining first bitmap information of the first data and second bitmap information of the second data when simultaneous transmission of the first and second data is required, and the transfer frame storing the third data is transmitted with the third bitmap information added thereto; and decomposing the third data into the first and second data on the basis of the first or second bitmap information obtained by decomposing the third bitmap information added to the transfer frame storing the third data when receiving the first or second data.

2. The method of claim 1, wherein the data is an IQ data block that is configured as a set of pieces of IQ data including values obtained by separating the radio signal into an I phase (In Phase) and a Q phase (Quadrature Phase), an IQ data frame prescribed by CPRI (Common Public Radio Interface) is used as the transfer frame, and the bitmap information is added by using a Vender Specific frame prescribed by the CPRI.

3. The method of claim 2, wherein the IQ data block is configured to include one or more pieces of IQ data information, each being a piece of IQ data used for one antenna carrier (AC),
the bitmap information is configured to include the number of one or more radio-signal types and one or more pieces of IQ data arrangement information corresponding to the respective one or more radio-signal types,
each of the one or more pieces of IQ data arrangement information includes the number of one or more pieces of IQ data information to be arranged in the IQ data block and a length of each of the one or more pieces of IQ data information, and
pieces of IQ data information are arranged in the IQ data block on the basis of the IQ data arrangement information with a predetermined arranging method.

4. The method of claim 3, wherein the third bitmap information includes first IQ data arrangement information on the first data and second IQ data arrangement information on the second data, and
combining the first and second data into the third data and decomposing the third data into the first and second data, are performed on the basis of the first and second IQ data arrangement information included in the third bitmap information.

5. The method of claim 3, wherein the one or more pieces of the IQ data information are sequentially arranged in the IQ data block from the top thereof, on the basis of the number of the one or more pieces of IQ data information and the length of each of the one or more pieces of IQ data information.

6. The method of claim 1, wherein the radio equipment has a function for simultaneously performing radio communication with both a first mobile terminal that transmits and receives the first radio signal and a second mobile terminal that transmits and receives the second radio signal,
a communication link is provided between a first radio equipment control that processes the first radio signal and a second radio equipment control that processes the second radio signal, and
the first radio equipment control transmits and receives the first data to/from the radio equipment via the second radio equipment control by using the provided communication link.

7. The method of claim 1, wherein a monitoring control frame is provided to transmit and receive monitoring control data for monitoring and controlling a radio signal between the radio equipment and the radio equipment control,
the monitoring control data is transmitted and received by transmitting and receiving the monitoring control frame storing the monitoring control data,
first monitoring control data for monitoring and controlling the first radio signal and second monitoring control data for monitoring and controlling the second radio signal, are combined into third monitoring control data with a predetermined arrangement method, so that the first and second monitoring control data is transmitted and received by transmitting and receiving the monitoring control frame storing the third monitoring control data, and
the third monitoring control data stored in the monitoring control frame is decomposed into the first and second monitoring control data when the monitoring control frame storing the third monitoring control data is received, so that the first or second radio signal is monitored and controlled on the basis of the decomposed first or second monitoring control data.

8. The method of claim 7, wherein the monitoring control frame is configured by using an HDLC frame prescribed by the CPRI.

9. The method of claim 7, wherein
the radio equipment has a function for simultaneously communicating with both a first mobile terminal that transmits and receives the first radio signal and a second mobile terminal that transmits and receives the second radio signal, by using a radio signal,
a communication link is provided between a first radio equipment control that processes the first radio signal and a second radio equipment control that processes the second radio signal, and
the first radio equipment control transmits and receives the first monitoring control data to/from the radio equipment via the second radio equipment control by using the provided communication link.

10. Radio equipment for communicating with a mobile terminal by using a radio signal, comprising:
a first radio communication part for performing communication of first data by using a first radio signal;
a second communication part for performing communication of second data by using a second radio signal different in a transmission method from the first radio signal;
a data communication part for performing communication with a radio equipment control by arranging the first and second data in a transfer frame;
a bitmap information input/output part for generating bitmap information defining a position in the transfer frame at which the first and second data arranged, and for extracting the bitmap information added to the transfer frame; and
a data combining/decomposing part for combining the first and second data into third data, and for decomposing the third data into the first and second data, wherein
the third data is combined on the basis of third bitmap information obtained by combining first bitmap information of the first data and second bitmap information of the second data, so that the transfer frame storing the third data is transmitted and received with the third bitmap information added thereto when simultaneous transmission of the first and second data is required,
the third data is decomposed on the basis of the first and second bitmap information obtained by decomposing the third bitmap information added to the transfer frame when obtaining the first or second data from the radio equipment control.

11. The radio equipment of claim 10, further comprising:
a first monitoring control part for monitoring and controlling the first radio communication part on the basis of the first monitoring control data received from the radio equipment control;
a second monitoring control part for monitoring and controlling the second radio communication part on the basis of the second monitoring control data received from the radio equipment control; and a monitoring control data combining/decomposing part for combining first and second monitoring control data into third monitoring control data, the first monitoring control data being used for monitoring and controlling the first radio communication part, the second monitoring control data being used for monitoring and controlling the second radio communication part, wherein the third monitoring control data is combined by arranging the first and second monitoring control data in a monitoring control frame with a predetermined method when simultaneous transmission of the first and second monitoring control data is required, so that the monitoring control frame storing the third monitoring control data is transmitted to the radio equipment control, and the third monitoring control data stored in the monitoring control frame is decomposed into the first and second monitoring control data when obtaining the first or second monitoring control data from the radio equipment control.

12. A radio equipment control for processing a radio signal, comprising:

a data communication part for transmitting a transfer frame storing data;

a bitmap information input/output part for generating bitmap information indicating an arrangement position on the transfer frame of the data, so as to transmit the transfer frame including the data with the generated bitmap information added thereto, and for extracting the data from the transfer frame on the basis of the bitmap information added thereto when receiving the data; and a data combining/decomposing part for combining the first and second data into third data and for decomposing the third data into the first and second data, wherein the third data is combined on the basis of third bitmap information that is obtained by combining first bitmap information of the first data and second bitmap information of the second data when simultaneous transmission of the first and second data is required so that the transfer frame storing the third data is transmitted with the third bitmap information added thereto, and the third data is decomposed into the first or second data on the basis of the first and second bitmap information obtained by decomposing the third bitmap information added to the transfer frame when obtaining the first or second data.

13. The radio equipment control of claim 12, further comprising:

a monitoring control part for monitoring and controlling first or second radio signals handled by radio equipment communicating with a mobile terminal by using the first or second radio signals; and a monitoring control data combining/decomposing part for combining first and second monitoring control data into third monitoring control data, the first monitoring control data being used for monitoring and controlling the first radio signal, the second monitoring control data being used for monitoring and controlling the second radio signal, wherein the third monitoring control data is combined by arranging the first and second monitoring control data in a monitoring control frame with a predetermined method so that the monitoring control frame storing the third monitoring control data is transmitted to the radio equipment when simultaneous transmission of the first and second monitoring control data is required, and the third monitoring control data is decomposed into the first or second monitoring control data when the third monitoring control data is received from the radio equipment.

\* \* \* \* \*